July 28, 1959 B. J. ARONSON 2,896,383
APPARATUS FOR COVERING WIRE GARMENT HANGERS
Filed June 26, 1956 11 Sheets-Sheet 1
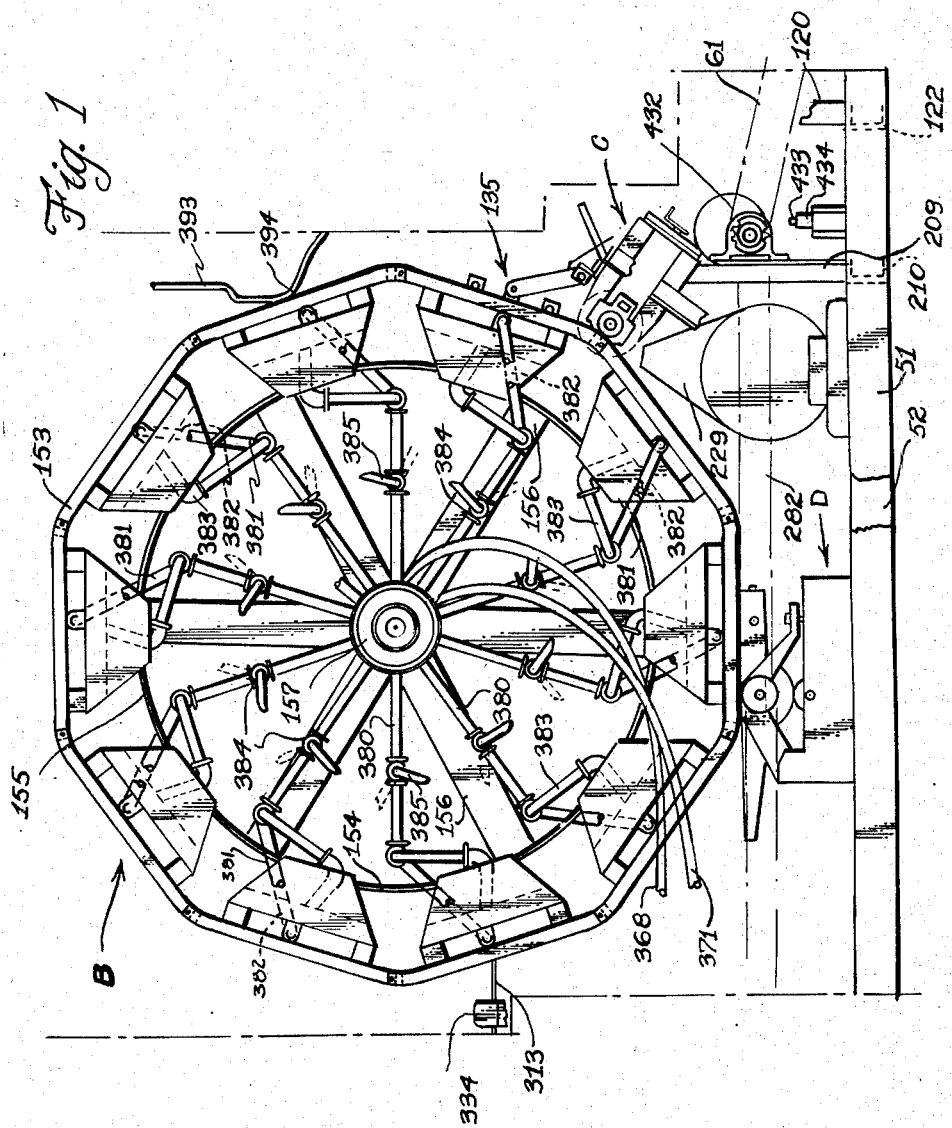
INVENTOR.
Ben J. Aronson
BY
Kegan and Kegan
Attorneys July 28, 1959 B. J. ARONSON 2,896,383
APPARATUS FOR COVERING WIRE GARMENT HANGERS
Filed June 26, 1956 11 Sheets-Sheet 2
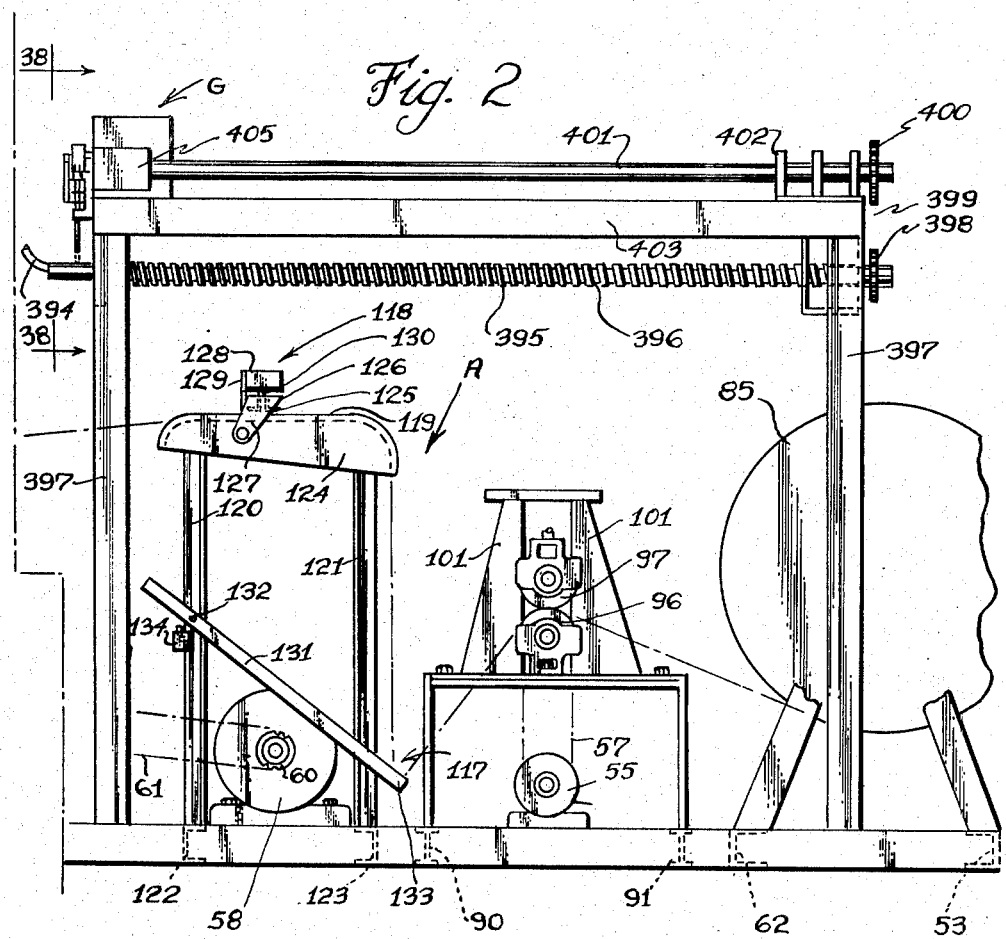
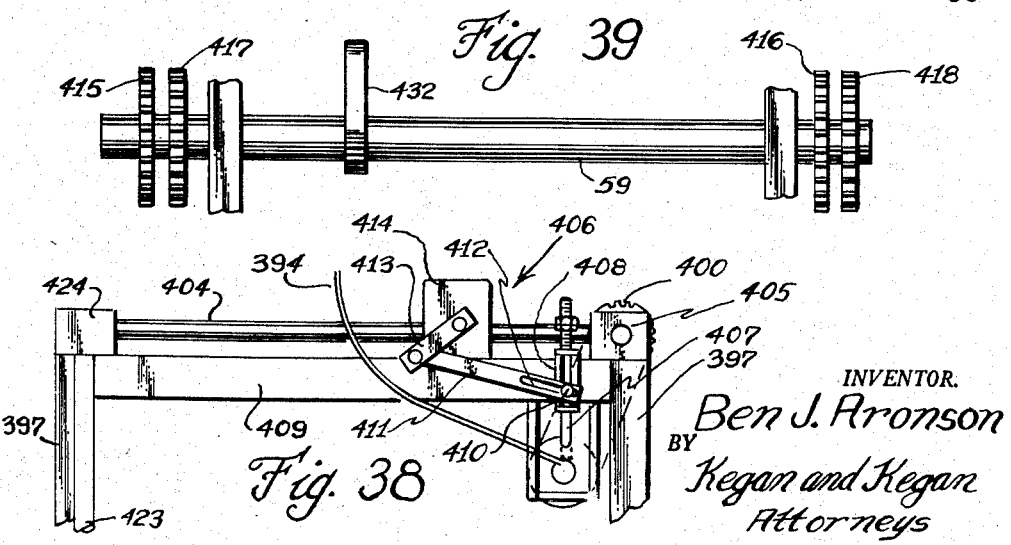
INVENTOR.
Ben J. Aronson
BY Kegan and Kegan
Attorneys

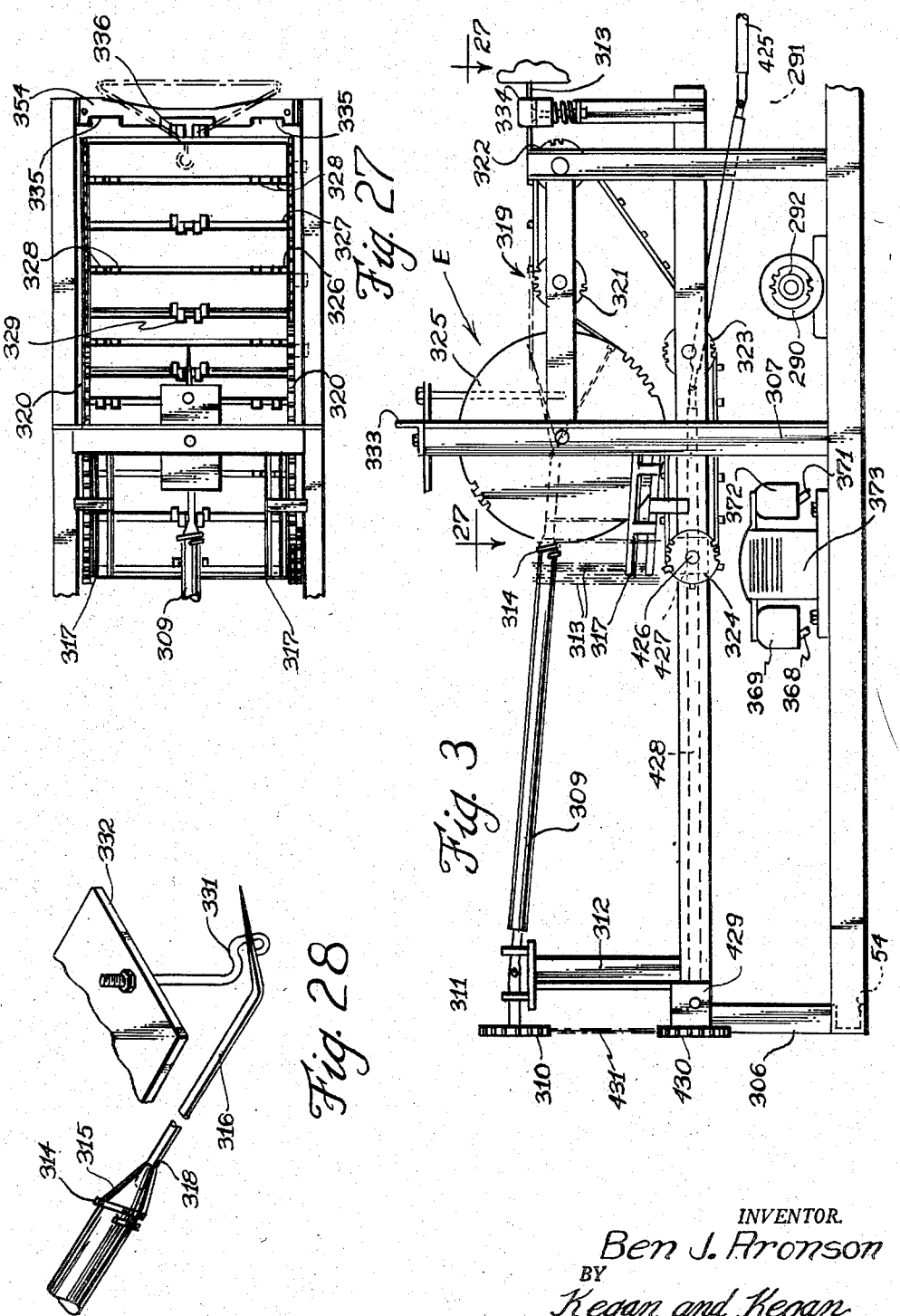

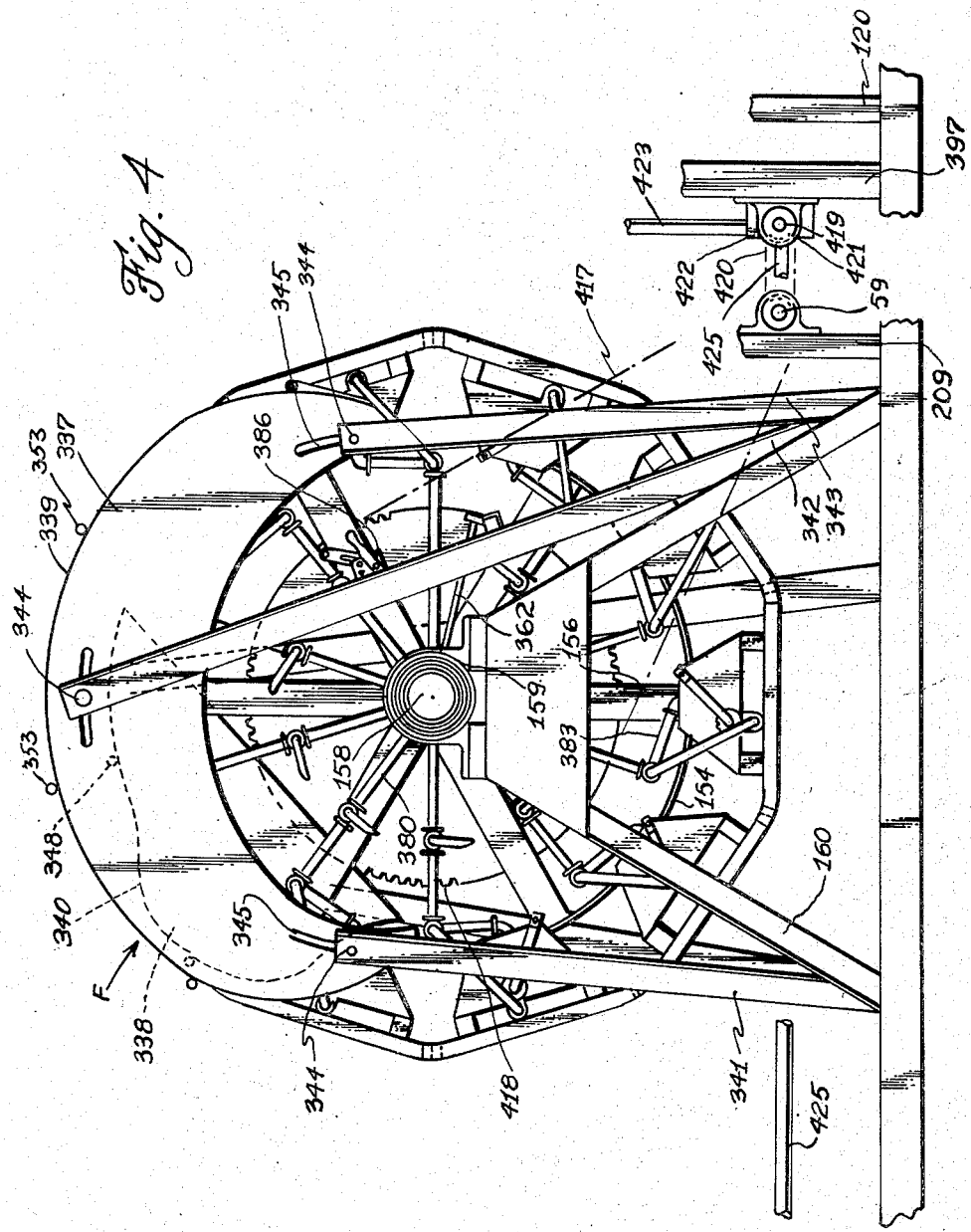

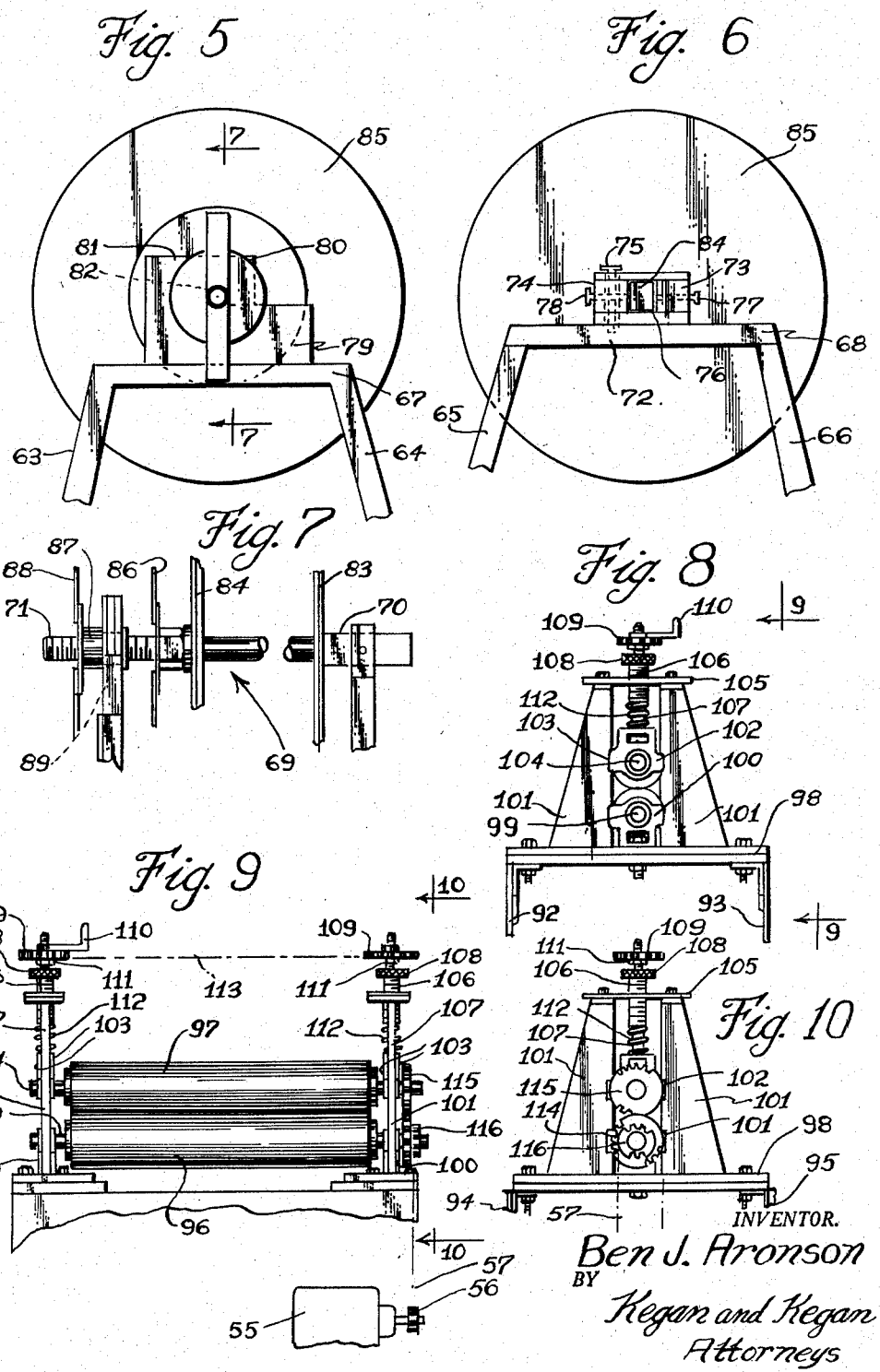

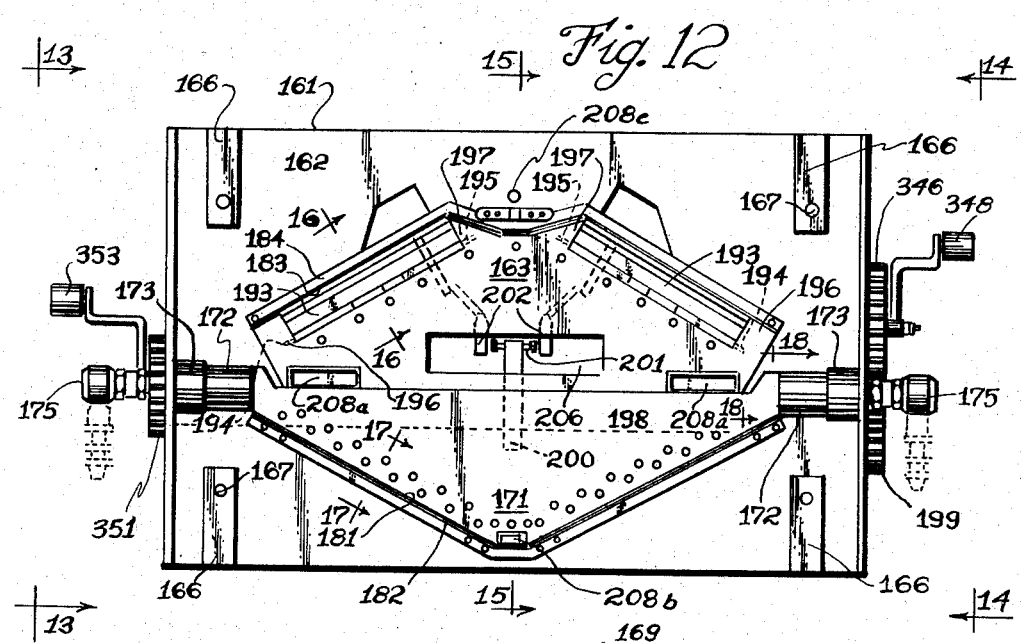

July 28, 1959  B. J. ARONSON  2,896,383
APPARATUS FOR COVERING WIRE GARMENT HANGERS
Filed June 26, 1956  11 Sheets-Sheet 7
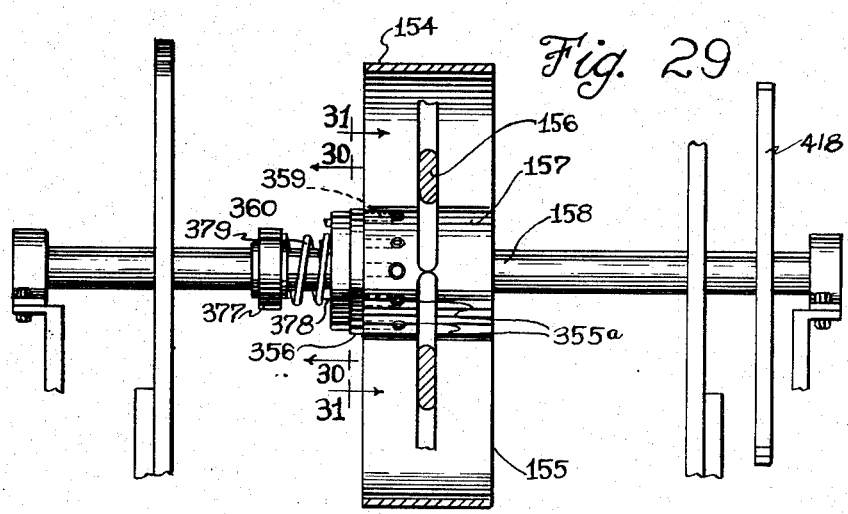
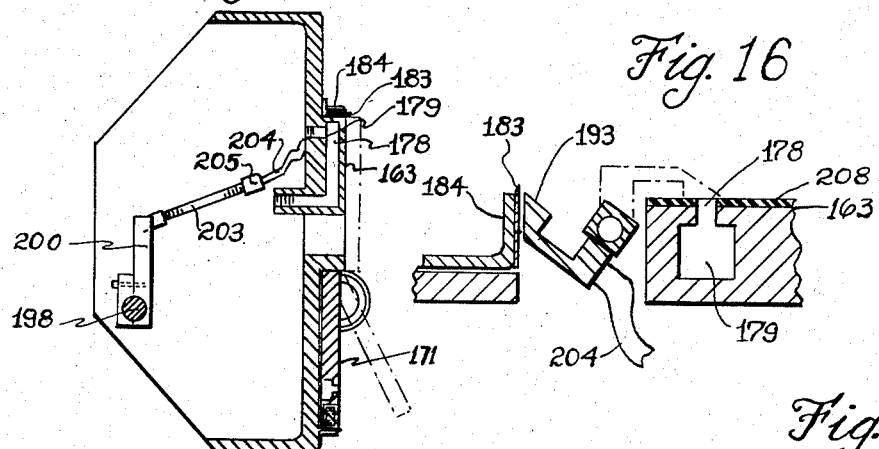
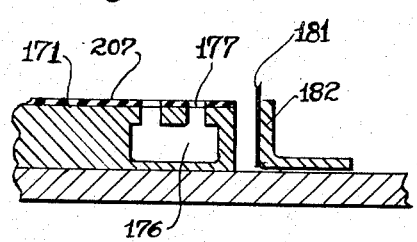
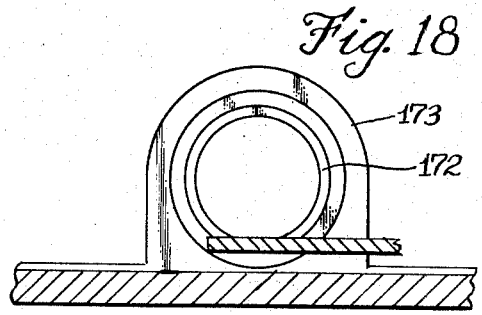
INVENTOR.
Ben J. Aronson
BY
Kegan and Kegan
Attorneys

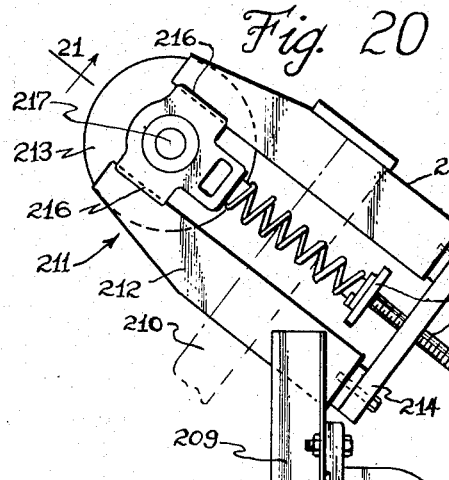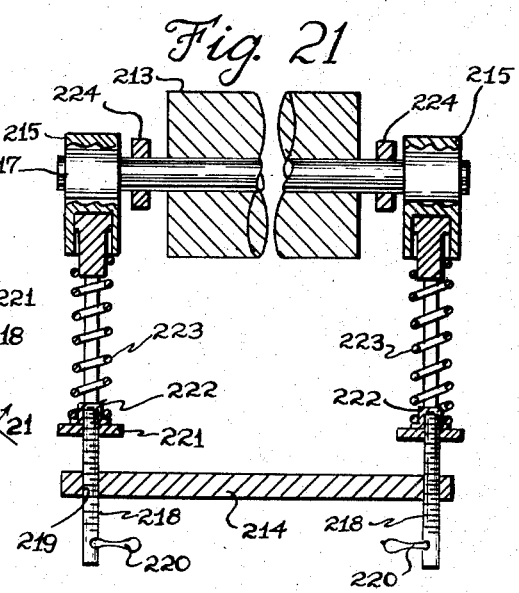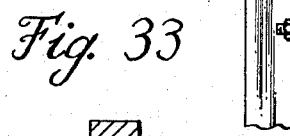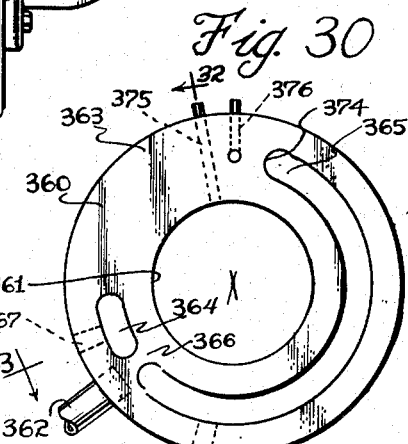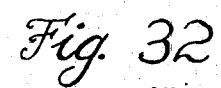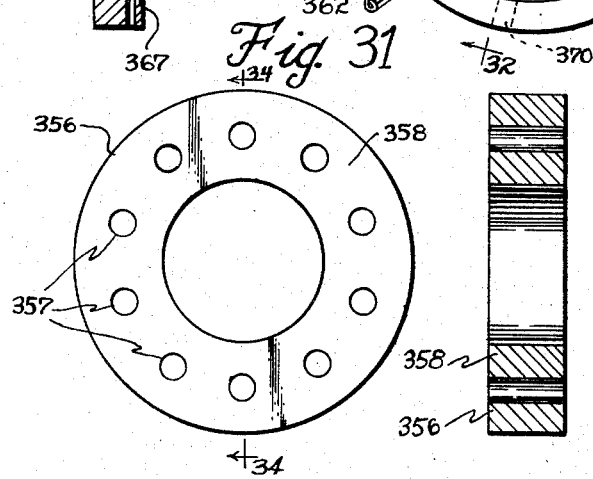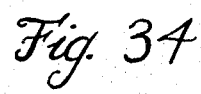

INVENTOR.
Ben J. Aronson
BY
Kegan and Kegan
Attorneys

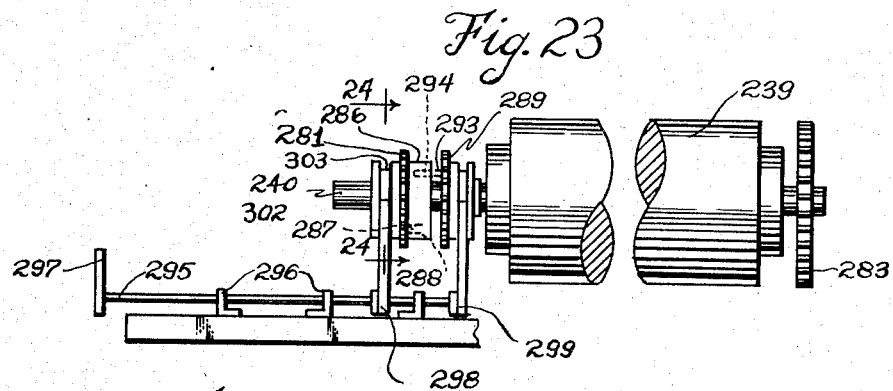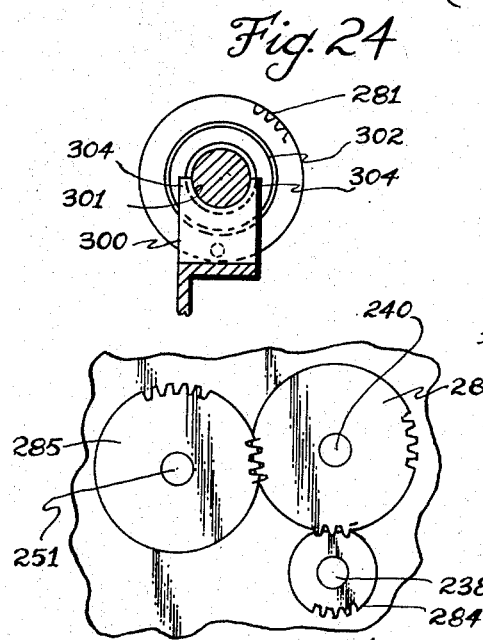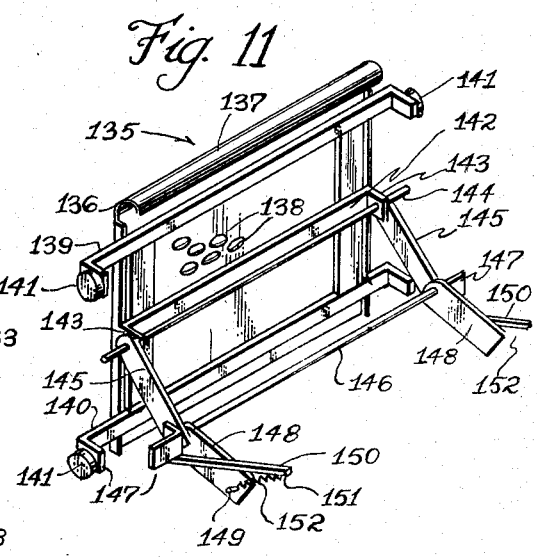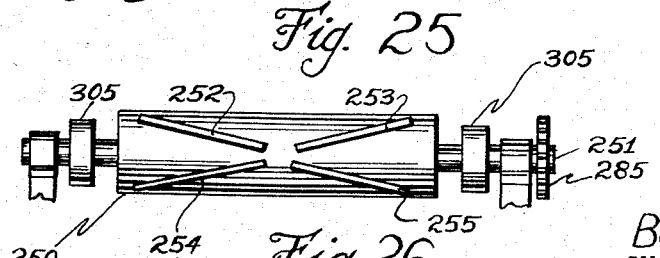

July 28, 1959     B. J. ARONSON     2,896,383
APPARATUS FOR COVERING WIRE GARMENT HANGERS
Filed June 26, 1956     11 Sheets-Sheet 11
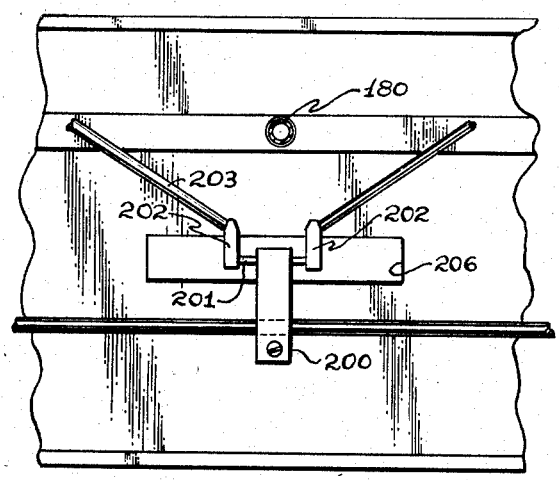
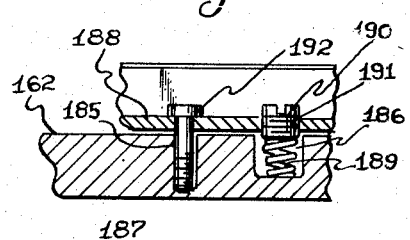
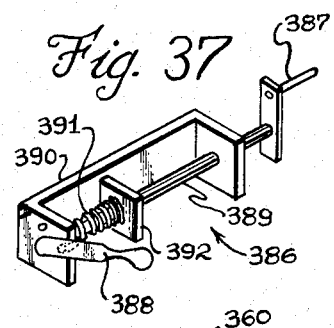
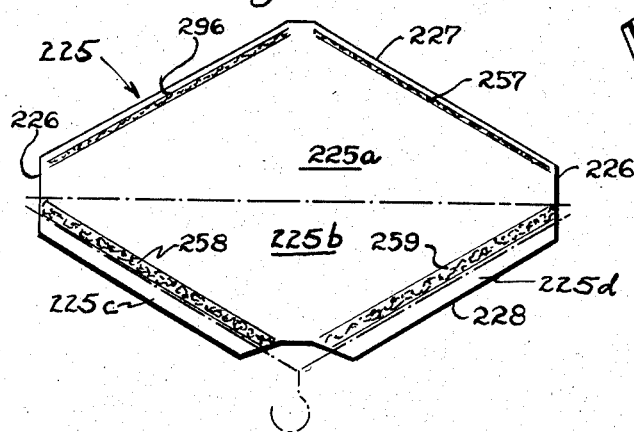
INVENTOR.
Ben J. Aronson
BY Kegan and Kegan
Attorneys

2,896,383
APPARATUS FOR COVERING WIRE GARMENT HANGERS

Ben J. Aronson, Skokie, Ill., assignor, by mesne assignments, to Aronson Hanger Covers, Incorporated, Chicago, Ill., a corporation of Illinois Application June 26, 1956, Serial No. 593,918

45 Claims. (Cl. 53—51)

This invention relates to wrapping machines; to a machine especially designed for wrapping garment hangers; and to a machine which automatically feeds a continuous supply of paper and hangers to a plurality of wrapping stations, enfolds and secures the hangers within covers formed from the paper, and collects the covered hangers.

More particularly this invention relates to apparatus which supplies a web of paper successively to a plurality of continuously traveling folding stations, cuts the desired cover blank from the paper web at each station, strategically applies glue to the successive cover blanks, supplies a continuous feed of hangers to successive stations in timed relation to the travel thereof, enfolds and secures the hangers within the cover blanks, and collects the wrapped hangers in bunches of predetermined number, the operation at the successive folding stations being at different stages of progress in the machine, with all operations occurring concurrently.

While the common wire garment hanger is produced to sell at a very low price, the practice has developed to cover the hangers with paper wrappers in order to protect the garments supported thereby against possible spots and stains from the rust formed on the hanger, and also to protect against the dirt and other foreign matter accumulating on the hanger during its manufacture and storage. Along with the wide approval and acceptance covered hangers have received, the manufacturers and users of covered wire hangers have found that the cover provides an excellent means for bringing printed advertising to the attention of the public. Moreover, the paper cover provides an additional convenient surface to which some garments, which ordinarily would slip from the hanger, may be pinned or otherwise secured. Actually, covered wired hangers have received such wide spread approval and used in the United States, that of the approximately two billion wire hangers produced and used annually, over one-third have some form of cover.

Despite this wide spread demand for covered hangers, nearly all hangers have their covers mounted thereto by manual operation. The most widely accepted method is to cut the paper blanks in a separate operation and thereafter form them into wrappers which are prepared to receive the hangers. The prepared covers are then collected and, in an independent separate operation which is usually manual, the hangers are inserted into the wrappers which are thereafter sealed. In any event, even while the wrapper cutting and forming operations may be accomplished by machines designed for such purposes, no presently known machine performs all the necessary operations automatically.

Also to be considered is the fact that the cost of hand labor has pushed the cost of covered wire hangers to a prohibitive price. Thus, the dealer or cleaner who separately purchases the hangers and wrappers finds that he must also bear the additional cost of inserting the hangers into the wrappers.

Even those very few known machines which are capable of enveloping a hanger in a pre-cut and formed wrapper have not met with any degree of acceptance, since their rates of production fall far short of what is needed to justify their use and cost. At the present time, there is no suitable machine available for automatically feeding paper, cutting blanks therefrom, delivering hangers to the blanks and wrapping and securing the hangers within the blanks.

In contrast, the present machine performs the operations of cover forming, cover gluing, hanger feed and enfolding, and hanger delivery, all automatically, sequentially and continuously.

Accordingly, an object of this invention is to overcome the foregoing and other known failings of equipment and methods for producing covered wire garment hangers.

A principal object of this invention is to provide a novel machine adapted to carry out automatically and continuously, work of the character specified.

Another object of this invention is to provide a machine capable of automatically cutting a cover sheet from a web of paper, delivering a hanger to the cover sheet, enfolding the hanger within the cover, and delivering the wrapped hanger to a point of discharge.

Another object of this invention is to provide a machine for automatically withdrawing paper from a continuous web thereof, cutting a cover sheet from the paper so withdrawn, applying an adhesive to specific areas of the cover sheet, delivering a hanger to the cover sheet, effectively enfolding and securing the hanger within the cover sheet, and thereafter delivering the covered hanger to a discharge point.

Another object of this invention is to provide a machine having a plurality of movable stations, sequentially towards which paper is drawn from a continuous web thereof and delivered to the stations in timed relation to their travel, and further to provide means for carrying paper on the stations, means for cutting cover sheets from the paper as the stations move, means for applying glue to the cover sheets, means for delivering hangers to the stations in timed relation to their travel, means for enwrapping the hangers within their cover sheets, and means for delivering the wrapped hangers in groups.

A further feature of this invention, of course, is that when the machine is in full operation, all operations occur substantially at the same time; namely, while a web of paper is being fed to one station, glue is being applied to a cover sheet carried by still another station, another station and its cover sheet are receiving a hanger, on another station the hanger is being enwrapped and secured in its cover sheet, while from another station a covered hanger is being deposited at a final hanger receiving point, whereby for each cycle of machine operation and station travel the machine rapidly and efficiently produces that number of covered hangers that there are stations.

Another objects of this invention is to provide a machine wherein a web of paper may be successively and continuously fed in preparation to receive hangers at a plurality of stations, the said web having cover sheets cut therefrom as it is held on the stations, the hangers being successively and continuously fed to the cover sheets, the machine and each station having certain instrumentalities to act upon the paper to accomplish retention of the paper on the stations, cutting of the cover sheets from the paper and folding of the cover sheets over their respective hangers.

A specific object of this invention is the provision of mechanism which is synchronized to deliver a continuous web of paper to the moving stations, and to further provide a novel vacuum system which holds the paper to the stations and has a unique means for selectively controlling the application of vacuum at each station.

A further object of this invention is to provide a novel receiving station which carries its own means for retaining the hanger and the paper thereon, and further carries its own cutting mechanism for producing a hanger cover sheet of the desired size and shape, and its own mechanism for enwrapping and sealing the hanger within the cover sheet.

A still further object of this invention is to provide a glue applicator station capable of applying a glue to strategic areas of each hanger cover sheet as the sheet passes thereby.

Another object of this invention is to provide hanger feed mechanism synchronized to the travel of the stations and capable of delivering hangers, one to each station as each station passes thereby.

Another important object of this invention is to provide a novel control structure for regulating the folding of the cover sheets over their respective hangers in accordance with the travel of each station towards a point of hanger discharge.

And, a still further object of this invention is to provide hanger take-off structure juxtaposed to the path of travel of the stations and capable of gathering the covered hangers in groups of predetermined number.

And, a still further feature of this invention is to provide for accurately timing all operations of the machine in accordance with the various positions of the different stations.

The foregoing and other objects, advantages, and features of construction will become more apparent from a consideration of the following description and the appended drawing.

In the drawings:

Figure 1 is a side elevation view showing the wrapping stations and a portion of the essential elements for carrying out this invention;

Figure 2 is a view similar to that of Figure 1 but showing the paper feed and hanger take-off apparatus;

Figure 3 is a view similar to that of Figures 1 and 2 but showing the hanger feed apparatus;

Figure 4 is a view similar to that shown in Figure 1, other essential elements for carrying out the invention;

Figure 5 is a side elevation view of the support structure for the roll of paper;

Figure 6 is a view of the paper roll support structure, looking at it from the other side;

Figure 7 is a sectional view taken along line 7—7 in Figure 5;

Figure 8 is a side elevation view of the paper feed pressure rollers;

Figure 9 is a view taken along line 9—9 in Figure 8;

Figure 10 is a view taken along line 10—10 in Figure 9;

Figure 11 is a perspective view of a platen assembly for leading the paper to the moving stations;

Figure 12 is a view looking directly at the face of one of the stations;

Figure 13 is a view taken on line 13—13 in Figure 12;

Figure 14 is a view taken on line 14—14 in Figure 12;

Figure 15 is a sectional view taken on line 15—15 in Figure 12;

Figure 16 is a sectional view taken on line 16—16 in Figure 12;

Figure 17 is a sectional view taken on line 17—17 in Figure 12;

Figure 18 is a sectional view taken on line 18—18 in Figure 12;

Figure 19 is a sectional view showing typical structure for mounting of the cutting edges to the face of a station;

Figure 20 is an enlarged side elevation view of the paper cutting station;

Figure 21 is a sectional view looking in the direction of the arrows 21—21 in Figure 20;

Figure 23 is a view showing the drive connections to the glue applicator rollers, and means for connecting the same to an auxiliary drive;

Figure 24 is a view taken along line 24—24, Figure 23;

Figure 25 is a view taken at the side opposite that shown in Figure 22, showing the interconnected drive for the glue fountain system;

Figure 26 is a view of the applicator roller for placing glue on the moving cover blanks;

Figure 27 is a plan view of a portion of the hanger feed mechanism, taken on line 27—27 in Figure 3;

Figure 28 is a partial perspective view of a portion of the hanger support rod shown in Figure 3;

Figure 29 is a simplified view of the station support shaft, showing the vacuum connections;

Figure 30 is a view taken along line 30—30 in Figure 29;

Figure 31 is a view taken along line 31—31 in Figure 29;

Figure 32 is a sectional view taken on line 32—32 in Figure 30;

Figure 33 is a sectional view taken along line 33—33 in Figure 30;

Figure 34 is a sectional view taken along line 34—34 in Figure 31;

Figure 35 is a view looking towards the underside of a station;

Figure 36 is a perspective view of structure for holding the vacuum chamber of Figure 30 stationary;

Figure 37 is a perspective view of the operating handle for individually opening each station to the vacuum sytem;

Figure 38 is a view taken along line 38—38 in Figure 2;

Figure 39 is a view of the main jackshaft; and

Figure 40 is a view of a cut cover blank.

Figure 22:
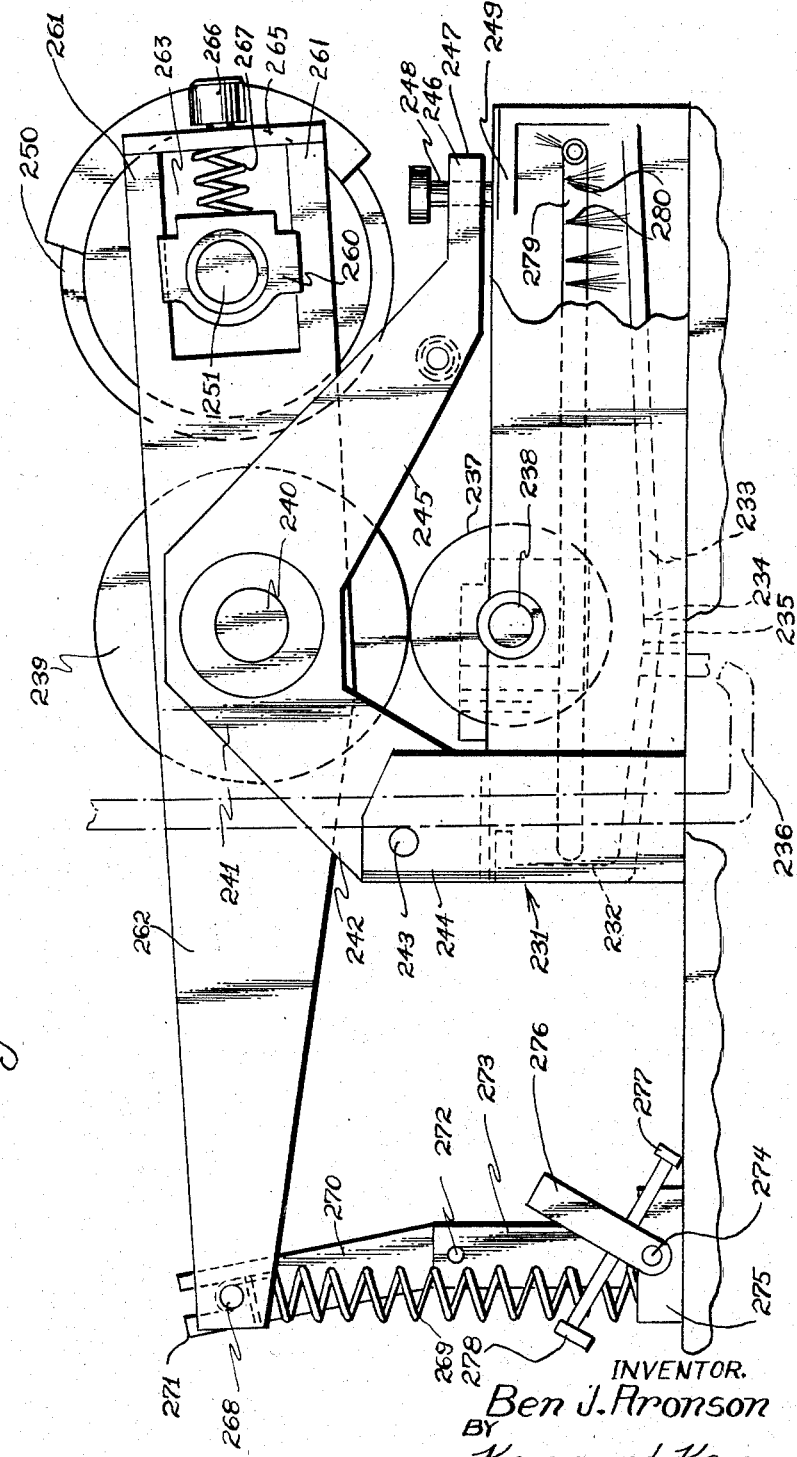
Figure 22 is an enlarged side elevation view of the glue applicator station, with certain parts removed for clarity.

Referring to Figures 1 to 4, the hanger wrapping apparatus generally comprises a paper feed mechanism A, folding stations B, paper cutter mechanism C, glue applicator station D, hanger feed station E, folding actuator apparatus F, hanger take-off station G, and a vacuum system (shown in detail in the various figures).

Briefly, the operation of the machine is as follows: the paper is fed from the paper feed mechanism A towards the folding stations B in timed relation with the travel of the folding stations. After being drawn and firmly held to a station B, by the vacuum system, the paper travels with the folding station B past cutter mechanism C, where, while being severed from its web, the paper is cut into the desired shaped cover blank. Travel of the cover blank with its station B continues past gluing station D where glue is strategically applied to certain portions of the blank. As station B and the cover blank travel past the hanger feed station E, a hanger is fed thereto in time relation to the travel of the station, after which the folding actuator apparatus and controls the folding of the blank over the hanger as the travel of the station continues toward hanger take-off G, where the completed or wrapped hangers are gathered. It is to be understood, of course, that more than one folding station is employed, that the herein described machine employs ten folding stations, since this number has been found adequate to meet most needs, but that any number of folding stations may be employed without departing from the the spirit of the invention.

Travel of the folding stations B is continuous; and, hence, operation on the various hangers and cover blanks is concurrent, although the operation is at various stages of progress in the machine. Moreover, successive feeds of the paper and the hangers at the respective stations is in time relation to the travel of the folding stations.

Referring first to Figures 1 to 4, it will be seen that the machine is mounted on a frame bed or support comprising front, back, and two side beam members, 51, 52, 53, and 54 respectively. The frame is completed by suitable cross beams to give it rigidity and to support the various members, as explained hereinafter.

Paper feed drive motor 55 rests on the frame bed, being coupled to the paper feed drive by means of sprocket 56 and chain 57. A principal drive motor 58, also mounted on the frame bed, is provided to supply driving power to the remainder of the machine, as explained hereinafter, through jack-shaft 59 and sprocket and chain assembly 60, 61. For convenience and simplicity in understanding the functioning of the machine and the nature and advantages of the invention, the portions of the machine will be divided into the assemblies as hereinbefore designated: the paper feed mechanism A, the folding station B, the cutter mechanism C, the glue applicator station D, the hanger feed station E, the folding actuator apparatus F, the hanger take-off station G, the vacuum system; and the various over-all synchronization of the various assemblies and their joint mode of operation thereupon will be readily understood.

The paper feed mechanism

Referring to Figures 2, and 5 to 10, mounted on cross pieces 53, 62, of the frame bed are four support pillars 63, 64, 65, and 66, which are paired together by cross arms 67, 68. Spanning the cross arms 67, 68, is a paper roll support shaft 69, which is square at one end 70, and round and threaded at the other end 71. Fixed to cross arm 68 is a block 72 having a side block 73 affixed thereto and a removable side block 74 held in position on the other side of shaft 69 by a removable pin 75 which extends through block 74 and into cross-arm 68. A housing 76, thus is formed by the four blocks for receiving the square end 70 of shaft 69. Relative positioning of shaft 69 to true up the paper feed is achieved by positioning screws 77, 78, which are threaded into blocks 73, 74, respectively, and are engageable with shaft end 70. Shaft removal at its square end, of course, is achieved by merely removing pin 75 and side block 74.

At its threaded end 71, shaft 69 is supported by an L-shaped block 79 which is fixed to cross arm 67. A smaller L-shaped block 80, pivoted to block 79 at 81, provides a housing 82 for shaft end 71. Positioning of end 71 into and out of housing 82 is achieved by pivoting block 80 from block 79 as required.

Fixed to shaft 69 adjacent its square end is a disk shaped plate 83 which cooperates with another disk shaped plate 84 to position a roll of paper 85 therebetween. A handle 86, fixed to plate 84 and threaded on shaft 69, controls the position of plate 84. The plates 83, 84, by pressing roll 85 therebetween, thus further are able to serve as a breaking arrangement to prevent the roll of paper 85, which is freely rotatable on shaft 69, from unwinding uncontrollably. Threaded to the extreme end of shaft 69 is a cylindrical member 87 having a handle 88 and a grooved portion 89 for receiving the upper edge of L-shaped block 79 which thus serves as a track for member 87. As is obvious, turning of handle 88 positions the shaft 69 axially, since cylindrical member 87 is maintained in position by the edge of the L-shaped block 79.

Mounted on cross pieces 90, 91 of the frame bed are four legs, 92, 93, 94, and 95, which support pressure feed rollers 96, 97, which pull the paper from its roll. A rectangular shaped frame 98 is joined to the top of the four legs. Roller 96, at each end, is supported by a rotatable shaft 99 held in bearing blocks 100—100 which are held between legs 101—101. Bearing blocks 100—100 are fixed to top frame 98. Bearing blocks 102—102, each having fingers 103—103, which straddle the legs 101, are provided to support rotatable shaft 104 which holds pressure roller 97. A cross-member 105 is provided atop each pair of legs 101—101, and each member 105 has threaded therethrough a cylinder 106, having internal threading for receiving a threaded shaft 107 which is fixed at its lower end to a respective bearing block 102. By turning the cylinders 106, vertical adjustment of each end of roller 97 can be achieved.

Fixed to the cylinders 106 is a knurled bearing surface 108 through which the upper end of shaft 107 extends to threadingly receive a sprocket wheel 109. The left hand sprocket wheel shown in Figure 9 has a handle 110 connected therewith to control its position. Immediately below each sprocket wheel 109 and fixed thereto is a threaded bolt 111 adapted to engage surface 108 as handle 110 is turned to move the sprocket wheel 109. Anchored around each shaft 107 and between bearing block 102 and cylinder 106 is a compression spring 112. Turning of cylinder of 106, of course, correspondingly varies the pressure at the respective end of roller 97, and hence, varies the pressure between roller 96 and 97.

Each end of roller 97 has the same structure for adjustability, with the exception that only the left hand side, as seen in Figure 9, has a handle 110 attached to its sprocket wheel 109. A sprocket chain 113 interconnects the sprocket wheels 100. Thus, the ends of pressure roller 97 may be selectively adjusted for pressure by turning the respective cylinders 106, or both ends may be simultaneously adjusted by turning handle 110.

Intermeshing gears 114, 115, are provided at the ends of shaft 99, 104, respectively. Power to the pressure rollers is applied through a gear 116 keyed to shaft 99, and linked to drive motor 55 by chain 57. Paper is always fed from pressure rollers 96, 97, at such rate as to provide a loop 117 for supplying slack paper which is available at all times for feed to the folding stations. As a result, there is no undue stress on the paper in this area.

A paper brake assembly, generally indicated at 118 in Figure 2, is provided to control the feed of the paper to the folding stations. The brake table 119 at each side is mounted on vertical legs 120, 121, which are fixed to suitable cross pieces 122, 123 of the frame bed. Side plates 124, on the table, guide the paper thereover. A brake bar 125, mounted above the paper guideway, is held in position by a cross piece 126 which straddles the guideway and is attached to each side of the table by an arm 127 pivoted to the table side. A solenoid 128, mounted on a cross arm 129 standing above the paper guideway, has a spring biased plunger 130 attached to the cross piece 127 for moving paper brake bar 125 into and from engagement with the paper. Synchronization of the energization of solenoid 128 with the demand for paper at the folding station is more fully explained hereinafter.

An arm 131 is pivotally mounted to each table leg 120 at 132, and between the arms 131 there is mounted a roller 133. Paper travel is from loop 117, under roller 133, to table 119. One of the arms 131 as it rotates counter-clockwise, as seen in Figure 2, is engageable with a switch 134 to close an electrical circuit which energizes drive motor 55.

As paper is pulled over table 119, paper loop 117 is expanded, and arms 131 are lifted counter-clockwise by the paper to close switch 134, whereby more paper is again fed to loop 117 until the arms 131 are allowed to return to the position shown in Figure 2.

The path of paper travel from table 119 towards the holding stations include a paper feed platen assembly, generally indicated at 135, which operates in timed relation to the travel of the folding stations to feed the paper thereto. Referring to Figure 11, included in assembly 135 is a platen 136 having a mounted leading end 137, approximately at the same elevation as table 119, and over which the paper travels. Platen 136 further has openings 138 over the entirety of its flat surface portion so as to release any possible vacuum created as the paper is fed to the stations. Mounted on and across the back side of the platen are two U-shaped cross members 139, 140, each of which holds a wheel 141 at each of its respective ends. The wheels 141 are engageable with a continuous track, hereinafter described, to limit the travel of platen 136 towards the folding stations. Also fixed to and across the back side of platen 136 is a third U-shaped cross member 142, the legs 143 of which hold circular rod 144. Pivotally mounted at each end of rod 144 is an arm 145, and rod 146, spanning across the arms 145, is held at the outer ends thereof. Angle brackets 147—147 fixed to cutter mechanism frame work, hereinafter described, pivotally hold the ends of rod 146 therebetween. Fixed to each arm 145, there is a projecting piece 148, which has at its outer most end a stud 149. Also welded to the cutter mechanism frame work are a pair of members 150—150, on each of which at the outer ends thereof there is a stud 151. Tension springs 152—152 are mounted between the pairs of juxtaposed studs 149, 151, so that a force is always provided to turn or urge the platen 136 towards the folding stations.

As best seen in Figure 1, the platen wheels 141 ride over the continuous track 153 carried by the folding stations. As the stations rotate clock-wise the wheels are urged into engagement with tracks 153 by the action of springs 152—152. This locates the platen 136 in close juxtaposition to the successive folding stations passing thereby and consequently positions the paper close to each folding station, which through the operation of its vacuum ports, then grabs the paper to pull it along. As is obvious from an inspection of Figure 1, platen 136 is closest to a passing folding station when the station is at approximately the same elevation as the platen. Shortly after this time the vacuum system takes over to pull the paper to the passing folding station.

It is understood, of course, that during the period that the continuous web of paper is pulled, solenoid 128 is de-energized. Also, as best seen in Figure 1, the folding station presently at the paper feed platen assembly 135 will pass the cutter mechanism C and thus form and sever the desired blank from the web of paper before the next successive folding station reaches assembly 135. Once a blank is severed from the web of paper, while the blank continues its travel with the holding station whereto it is held by the vacuum system, the continuous web of paper experiences no pulling or feed action until the next successive folding station picks it up at platen 136. During the period when the strip is not attached to any folding station to be pulled thereby, brake solenoid 128 is energized to prevent any accidental paper feed. In the meanwhile, the paper web merely overlies platen 136 until it is picked up by the next folding station, at which time solenoid 128 is de-energized.

The folding stations

Referring to Figures 1, 4, and 29, it is seen that the folding stations B are mounted at the rim 154 of a large wheel 155 having spokes 156 which interconnect rim 154 to the wheel hub 157. Hub 157 is keyed to a rotatable shaft 158, each end of which is journaled in a pillow block 159 affixed to the upper edge of an inverted V-shaped frame 160 which is suitably attached to the frame bed members.

Figures 1 and 4 show ten folding stations mounted to the wheel rim 154. However, any desired number of stations can be provided, depending upon the diameter of rim 154 and the rate of production that is required. It is understood of course that the folding stations are all similar, and that therefore a description of one station is applicable to all stations.

Referring to Figures 12–19, the folding station comprises a main casting 161 having a generally flat surface 162 and a slightly elevated flat portion 163, generally shaped to approximate the shape of the hanger to be wrapped. Side plates 164, 165, are provided on the sides of casting 161. Adjacent each corner of the face of casting 161, there is an integral upwardly standing leg 166 having a threaded hole 167 for receiving a bolt to mount a track section 153a at each side of the casting. Each track section 153a at its ends has a curved portion 168 which is cut out at 169 to meet adjacent track sections of adjacent folding stations so as to present a continuous track 153, as seen in Figure 1. The individual tracks 153a are affixed together by means of a bolt which is drawn through the paired holes 170 of abutting sections.

Mounted too the face of casting 161, is a triangular shaped folder flap 171, approximately similar in shape to casting elevated portion 163, but inverted in position thereto. As flap 171 is rotated about an axis in the area in which it forms a common border with elevated portion 163, it is brought into a position where its edges generally coincide with the edges of elevated portion 163. At each of the opposed end of the base of triangular shaped flap 171, a hollow shaft 172 is attached, and each shaft 172 is journaled in a respective bearing block 173 fixed to the face of casting 161. One of the shafts 172, as seen in Figures 12 and 13, has a gear 174 keyed thereto for rotating flap 171. Each hollow shaft 172 at its outer end carries a freely pivotal nozzle 175 for evacuating the vacuum chamber 176 which is located along the outer edges of flap 171. Along the face of flap 171, a series of openings 177 are provided for leading into chamber 176.

Casting elevated portion 163, along its outer edges, also is provided with a series of openings 178 which lead to a vacuum chamber 179. At the rear of casting 161, a nozzle 180 is attached for evacuating chamber 179.

Adjacent to the outer edges of flap 171, when it is in the position shown in Figure 12, a V-shaped knife edge 181 is provided, being held to an angle shaped mount 182 attached to the face 162 of casting 161. Similarly, a V-shaped knife edge 183 is held adjacent to the edge of casting elevated portion 163 by an angle shaped mount 184 attached to casting face 162. Each of the knife edges 181, 183, has sufficient span to straddle entirely across the face of the paper fed to the station, so that cutting of the blank by the knife edges completely severs the blank from the continuous strip of paper.

Figure 19 shows typical structure for mounting the knife edges to the casting face 162. Paired openings 185, 186, are provided in casting 161 along the area where the knives are to be mounted. Each opening 185 is threaded for receiving a screw 187 drawn through the base 188 of the knife mounting bracket. In each opening 186, a compression spring 189 is provided. The spring is engageable with the leading edge of a set screw 190 which is threaded through a threaded opening 191 in bracket base 188. While the spring 189 tends to urge the bracket and knife edge upwardly, this movement is limited by the head 192 of screw 187. By turning set screw 190, the force of spring 189 can be correspondingly varied.

As best seen in Figures 12 and 16, a pair of pivoted folder flaps 193—193 are mounted between a portion of knife edge 183 and the edge of elevated portion 163. Each folder flap 193 is pivoted to elevated portions 163 by means of bars 194, 195, which extend respectively into projections 196, 197. Mounted on a shaft 198, extending through casting side plate 165 is a gear 199. Shaft 198 extends beneath casting 161 and at the casting center portion has an arm 200 locked thereto. At its other end arm 200 carries a transverse rod 201 fixed thereto. At each end of rod 201 there is fixed a member 202. To each member 202 there is attached appropriate linkage 203, 204, which are connected together by a turnbuckle 205 which allows linkage adjustment. Each link 204 is attached to a respective one of the folder flaps 193. As gear 199 is turned, it turns rod 198 which causes arm 200 to pivot. As the arm 200 pivots, it causes movement of the folder flaps 193—193 through the movement of the rod 201 and the linkages 204, 205. Opening 206 in casting face 162 provides access for adjustment of the linkage for folder flaps 193—193.

As will become more apparent hereinafter, the folders 171, 193—193, accomplish three results. They act to correctly position a hanger on the station, fold cover blank areas over the hanger sides, and press the folded areas to areas of glue on the cover blank to secure the cover on the hanger.

As seen in Figures 16 and 17, the faces of flap 171 and casting elevated portion 163, respectively are covered with layers 207, 208 of rubber. The purpose of the rubber is to allow a certain amount of pressure of the paper cover over the hanger structure as the flaps are folded.

Each station further carries a pair of permanent magnets 208a—208a mounted to casting 161, while each flap 171 carries a permanent magnet 208b. The purpose of the magnets is to retain a hanger on to the station, as explained hereinafter.

Paper cutter mechanism

As the paper is drawn to a folding station by the vacuum system, it still is connected to the paper supply roll. Travel of the stations to the stations, however, brings the paper carried thereby to cutter mechanism C where a blank is cut in the shape outlined by knives 181, 183, and the paper side edges or web.

Referring to Figures 1, 20, and 21, the cutter mechanism is mounted on legs 209 welded to a cross-piece 210 of the frame bed. Legs welded to the frame bed provide additional support and rigidity to the cutter mechanism. A cutter roller frame 211 is fixed to legs 209 and held at an angle to the horizontal. The roller frame includes paired guide rails 212—212 at each end of the cutter pressure roller 213, and a bottom plate 214, welded to legs 209 and from which the paired guide rails 212—212 extend. A bearing block 215 is mounted between each pair of guide rails, and each bearing block 215 has fingers 216—216 which straddle the edges of the rails for guidance. A rotatable shaft 217 is mounted in the bearing blocks, extending therebetween, to support a cutter pressure roller 213 which is keyed to the shaft 217. Roller 213 preferably is made of chrome plated steel and is of such diameter as to engage the knife edges 181, 183, as they pass thereby.

Each bearing block 215 is maintained in its upper position by a screw 218, threadable through a threaded opening 219 in plate 214, having a handle 220 at its outer end to facilitate turning, and further carries a support plate 221 and stub 222 against which a coiled compression spring 223 is anchored. Threading of screw 218 into plate 214 compresses spring 223, which at its other end is anchored against a respective bearing 215. Thus, the bearings are maintained in position by their respective compression springs, and, in turn, retain roller 213 in an extended position. Of course, each screw 218 allows individual adjustment of the position of the respective ends of cutter pressure roller 213 so that there will be proper pressure along the entire length of knife edges 181, 183, as they engage roller 213.

Between each end of roller 213 and the bearing block adjacent thereto, there is a roller 224. The rollers 224 are so located on shaft 217 and are of such diameter as to engage a respective continuous track 153 carried by the folding stations. The cooperation of the rollers 224 with the tracks 153 serves to counter-act or limit the effect of the pressure of the knife edges 181, 183, against roller 213.

Travel of the folding station past cutter mechanism C causes the cooperating knives 181, 183, and rollers 213 to form the cover blank 225 shown in Figure 40. Blank sides 226—226 are the web of the paper, while edge 227 outlines the cut of knife 181, and edge 228 follows the cutting line of knife edge 183. The scrap paper which results from the cutting action falls into a bin 229 leading to the shredder 230. As seen in Figure 2, the upper of the guide rails 212—212 provides the support of the paper feed platen assembly 135, with angle brackets 147 being welded thereto for this purpose.

The cover blank 225, as seen in Figure 40, is in the form of two triangular shaped body portions 225a, 225b, joined at their bases. The legs of each triangle approximate the position of the shoulder bars of the hanger to be covered. Two narrow foldable covering portions or flaps 225c, 225d, are provided, one on each leg of triangle 225b, for folding over the hanger shoulder bars to hold the cover in place.

The glue applicator station

From the cutter mechanism, the folding station carries its blank to the glue applicator station D where glue is applied to the shaded portions of the blank shown in Figure 40. Operation and design of the glue applicator apparatus is so synchronized with the travel and shape of the blank 225 that no other area on the blank but the shaded portion shown in Figure 40 has glue applied thereon.

As seen in Figures 2 and 22 to 26, the gluing apparatus comprises a compartment 231 having a glue pot 232 to hold the liquified glue. The bottom 233 of glue pot 232 is slightly V-shaped so that its lower most portion 234 has an outlet 235 for draining purposes. Filling of glue pot 232 is accomplished through inlet pipe 236.

The glue fountain system is as follows. A first lower most roller 237, having its axis above the lower most tub portion 234, is supported on a rotatable shaft 238 which extends between and is rotatably mounted on the sides of compartment 231. A second roller 239, positioned parallel to and above roller 237 so that the surfaces of the rollers nearly touch, is supported on a rotatable shaft 240 held between inverted substantially V-shaped supports 241, each of which has one leg 242 pivoted at 243 to a respective pillar 244 which extends from the frame bed. The other leg 245 of each support 241 has an extension 246 having an opening 247 through which bolt 248 is threaded for abutting engagement with an upper structural piece 249 of compartment 231. By turning bolt 248, support 240 correspondingly pivots to thus vary the distance between rollers 237, 239. As a result, the amount of glue fed from roller 237 to roller 239 can be controlled.

A third roller 250, supported on rotatable shaft 251, picks up the glue from roller 239 by means of spiral pads 252, 253, 254, and 255. Pads 252 and 253, are so mounted on roller 400 that they will apply glue only to the areas 256 and 257 of cover blank 225, while pad 254 and 255 apply glue to cover blank areas 258 and 259, as the folding stations pass thereby.

Shaft 251 at each end is supported in a bearing block 260 held in between guide arms 261—261 of lever 262. Each arm lever 262 at its center portion is rotatably supported on shaft 240. Each bearing block 260, is positionable in the slot 263 in arm 262 by a shaft 264 attached to the bearing block and threadable in end plate 265 mounted on the end of arm 262. A knurled knob 266 is provided at the end of shaft 264 to facilitate its turning. A compression spring 267 is anchored about each shaft 264 and between plate 265 and each bearing block for urging roller 250 and its glue pads towards the moving stations.

The pivotal arms 262 at their respective ends remote from compartment 231 are interconnected by a shaft 268. From shaft 268 and adjacent to each arm 262, a tension spring 269 extends to the frame bed. Also, at each arm 262, a link 270, having a forked end 271 engaging shaft 269, extends downwardly. Each link 270 is pivotally connected at 272 to a second link 273 keyed to shaft 274 which is rotatably supported at its ends in blocks 275 fixed to the frame bed. One end of shaft 274 has a handle 276 fixed thereto to facilitate turning, and stops 277, 278, extending transversely from handle 276 and engageable with the frame bed member 51, limit rotation of shaft 274. As handle 276 is rotated counterclockwise from its position shown in Figure 22, it correspondingly turns shaft 274 and link 273. This causes links 270, 273 to become aligned, and rotates the arms 262 clockwise to move the glue pads from a position where they can contact the stations. Return of handle 276 to its original position shown in Figure 22, of course, moves the pads to an operable position.

Since, when the apparatus is first being started, no cover blanks are carried by the moving stations, it is advantageous to remove the glue pads on roller 250 from the position where they can contact the stations. Hence, handle 276 is turned counterclockwise, and the glue applicator apparatus is made inoperable until the station first carrying a cover blank nears the gluing apparatus, at which time handle 276 is turned to the position shown in Figure 22, at which time the springs 269 act to urge the pads into contact with the moving cover blanks.

Within glue pot 232, a water pipe 279 is provided. Pipe 279 has spaced outlets 280 which distribute water in the glue pot to facilitate its cleaning. The cleansing water can be drained through outlet 235, which, of course, has a suitable plug for closing.

Referring to Figures 23 to 26, power to turn the glue applicator rollers is supplied through a sprocket wheel 281 on shaft 240 and driven by chain 282 which is connected to main jackshaft 59. As shaft 240 turns, it transmits power through gear 283 to gears 284 and 285, respectively on roller shafts 238 and 251.

Since the apparatus may be stopped at times while there is glue in glue pot 232, it is advantageous to provide auxiliary means for turning the glue fountain rollers in order to prevent hardening or setting of the glue. However, while an auxiliary drive turns the rollers, it is necessary to uncouple sprocket 281 from the main jackshaft 59.

To achieve this, sprocket wheel 281 is not keyed to shaft 240, but is slidably and rotatably mounted thereon. Adjacent to wheel 281, a cylinder 286, fixed to shaft 240, is provided. A stub 287 extends from wheel 281 and is engageable in a mating aperture 288 in the end of cylinder 286 adjacent thereto. Similarly, a second sprocket wheel 289 is slidably and rotatably mounted on shaft 240. Sprocket wheel 289 is connected to an auxiliary drive motor 290, best shown in Figure 3, by a chain 291 and sprocket wheel 292 on the motor drive shaft. A stub 293 projects outwardly from wheel 289 towards the other end of cylinder 286, which has a mating opening 294 wherein the stub 293 is engageable.

Locking of the respective sprocket wheels 281, 289, to cylinder 286 is achieved by a shift arrangement including an axially movable bar 295, mounted in brackets 296 and having a handle 297 at its outer end. Fixed to bar 295 are two arms 298, 299, each of which carry a structure 300 having a semicircular cutout portion 301 at its uppermost end. Each sprocket wheel 281, 289, further has a cylinder 302 fixed thereto for slidable and rotatable movement on shaft 240. Each cylinder 302 has a groove 303 in which ride fingers 304—304 resulting from the cutout portions 301. As bar 295 is shifted axially, it selectively positions the wheels 281, 289, to connect shaft 240 either to jackshaft 59 or auxiliary motor 290. In either event, only one of the sprocket wheels 281, 289 can be locked to shaft 240 at a time, thus assuring that the separate glue applicator drives will not be affected by each other.

Only one stub 287 is provided on sprocket wheel 281, and only one mating opening 288 is provided in cylinder 286. Thus, while shaft 240 may be disconnected from the auxiliary drive at a point where stub 287 does not meet opening 288, the alignment of stub 287 and opening must be achieved before shaft 240 is connected to jackshaft 59. The necessity of achieving this alignment assures that the roller 250 and its gluing pads always will be synchronized to the travel of the moving stations.

Figure 26 shows the position of the gluing pads on the roller. If the pads were unwound to a flat surface, they would approximate the shaded areas of the cover blank 225 shown in Figure 40. Also seen in Figure 26 are a pair of rollers 305—305 mounted adjacent the ends of shaft 251. Rollers 305—305 are engageable with the tracks 153 carried by the moving stations to thus limit the movement of the pads against the stations.

Hanger feed mechanism

From the glue applicator station, the moving stations travel towards the hanger feed mechanism which supplies hangers, one to each station, and in timed relation to the travel thereof. All operations are continuous and synchronized to set a hanger on each station in preparation for the folding operations which immediately follow.

Referring to Figures 3, 27, and 28, the hanger feed mechanism is supported on the frame bed by legs 306, 307, and 308. A rod 309, driven by gear 310 through coupling 311, is rotatably mounted on a standard 312 and at an angle whereby it is inclined downwardly, starting at its back end. The diameter of rod 309 is such as to accommodate the hook portion of the hangers 313 and to feed them downwardly with the aid of gravity as the rod turns. At its forward end rod 309 has a screw feed portion 314 which acts to meter the hangers 313 supported thereby one for each rod revolution. From the screw feed the hangers travel down a conically shaped surface 315 to rod 316, while the hanger lower portions travel between guide rod structures 317—317 which prevent hanger lateral movement. Rod 316 extends into the open end 318 of conical surface 315 to further provide the front support for rotatable rod 309. As the hangers move down rod 309, their lower portions are engaged by an endless conveyer 319.

The endless conveyer 319 comprises a pair of sprocket chains 320—320 which follow a path of travel around sprocket wheels 321, 322, 323, 324, and large sprocket wheel 325. Extending between chains 320—320 and carried thereby are alternately arranged rods 326 and 327. Each rod 326 carries a pair of permanent magnets 328—328 adjacent each of its ends, while each rod 327 carries paired permanent magnets 329—329. As each hanger travels through screw feed portion 314, the travel of chains 320—320 is so timed as to have a rod 326 and the magnets carried thereby engage the lower bar of the hangers to push the hangers down rod 316 and then up an incline portion 330 of rod 316. Rod 316 is held by a hook 331 suspended from plate 332 held by cross piece 333 extending between legs 307—307. While the hanger hook portions follow the path prescribed by rods 309 and 316, the hanger lower bar portions are pushed by rods 326 and their magnets along a path prescribed by large sprocket wheel 325 and sprocket wheel 321. When the hanger hook portions reach the end of rod 316, they slide off and are immediately engaged by the magnets 329—329 carried by the alternate rods 327. The hanger shoulder portions rest on and are carried by the magnets 329—329, thus allowing the hanger to slide relative to the rods 327 as their lower bars are picked up by the moving stations, as explained hereinafter.

Between sprocket wheels 321, and 322, the hanger travels in a near horizontal position and direction towards a stripper plate 334. As the rods 326 are carried around sprocket wheel 322 for their return flight, they deliver their hangers onto stripper plate 334, whereafter the magnets 328—328 pass through the stripper plate slots 335—335 while the hanger lower bars remain in the plate. As a hanger lower bar rests on plate 334, it is pushed forward by the travel of conveyer bar 327 and into a position where it can be picked up by the magnets 208a—208a carried by a station passing thereby. It is understood, of course, that the travel of each station and the travel of the hangers on conveyer 319 are so timed that each station reaches a position where its magnets 208a—208a will engage the lower bar of a hanger at the moment the hanger lower bar extends beyond strip plate 334.

As the hanger lower bar is attracted by the magnets 208a—208a and begins its travel with the station, the hanger shoulder portion, which continues to rest on the magnets 329—329, may experience a small amount of movement relative to bar 327 due to the fact that the travel of the lower bar on the station causes the hanger to be swung in an arc about the magnets 329—329. However, the shoulder portion continues to travel on the magnets 329—329 until the magnets pass through stripper plate slot 336 to free the hanger from conveyor 319. The hanger thereafter swings about an axis described by magnets 208a—208a until it comes to rest on casting elevated portion 163. To assure that the hanger rests securely on the station, a fourth magnet 208c is provided at a position where it will attract the hanger neck. Actually, magnet 208c never touches the hanger neck, since the magnet is covered by rubber, but is sufficiently strong to bring the swinging hanger to a standstill. Thereafter, the hanger travels on the cut cover blank and with its station, being held thereto in an upside down position, its leading edge being what is normally the hanger lower bar portion.

*Folding actuator apparatus*

Once the hanger 313 is firmly held in position on the folding station, the folding actuator apparatus takes over to control the operation of the folders 171, 193—193. The folding operation takes place as the station continues its travel, and is so timed that the hanger 313 is wrapped and secured within its cover 225 by the time the station reaches the hanger point of discharge.

Referring to Figure 4, a pair of plates 337, 338 are mounted one on each side of wheel 155, each plate having a respective cam surface 339, 340. The surface 340 of plate 338 extends approximately half the distance of surface 339. Mounted on crosspieces of the frame bed are three legs 341, 342, 343, which support plate 337. Each of the legs is connected to plate 337 by means of a similar bolt and nut arrangement 344 which extends through the leg and an arcuate slot 345 in the plate. A similar arrangement (not shown) supports plate 338. The slots 345 allow adjustable positioning of the plates to synchronize the operation of the folder flaps 171, 193—193.

Referring back to Figures 12–14, each station carries a rotatable gear 346 which meshes with gear 199. An arm 347, lock to gear 346 to control the rotation thereof, carries a cam follower roller 348 at its outermost end. A tension spring 349 extends between projecting member 350, fixed to side plate 165, and arm 347 to maintain roller 348 in a position where it is engageable with cam surface 340 as the roller passes thereby. Thus, as roller 348 follows the contour of surface 340 it controls the position of flaps 193—193.

As seen in Figure 13, each station further carries a rotatable gear 351 which meshes with gear 174. Fixed ot gear 351 is an arm 352 which controls rotation thereof by means of a cam follower roller 353 which is engageable with cam surface 339. A tension spring 354 extends between arm 352 and a projecting piece 355, attached to side plate 164, to maintain roller 353 in position to engage cam surface 339. As roller 353 travels over surface 339, it turns gear 351 to rotate folder 171.

Cam surface 339 extends in an arc which approximates 180 degrees. Each end of surface 339 allows folder 171 to be positioned in a fully open position. As wheel 155 rotates clockwise, as seen in Figure 4, from the time roller 353 first hits surface 339 to a point where the wheel has turned approximately 95 degrees, folder 171 is moved from fully opened position to fully closed position. Thereafter folder 171 is again moved to its fully opened position.

Each end of cam surface 340 controls the movement of folders 193—193 to fully open position. Surface 340 is so shaped, however, as to rotate the folders 193—193 from fully open position to close position and back to open position before folder 171 reaches its fully closed position. Thus, the trailing edge 228 of the cover blank 225 is folded over the hanger shoulder portions and sealed against glue areas 258, 259, in readiness to receive the cover blank area which is folded by folder 171. As folder 171 finally reaches its fully closed position, it presses the glue areas 257 and 258 moved thereby into engagement with the already folded portion of the blank which enfolds the hanger shoulder portions, to thus secure the hanger 313 in its wrapper. The resilient rubber layers 207, 208 on the faces of folder 171 and casting elevated portion 163, respectively, experience a degree of compression by the action of folders 171 and 183—183 during the folding operation to assure that an effective grip is secured by the cover blank glue areas.

*The vacuum system*

A vacuum is applied to each station from the time the station passes a point slightly before the cutter apparatus until the station passes the point where the large folder 171 starts its rotation back to its fully open position. At the latter point, the vacuum must be removed so that, as the folder 171 returns to its open position, its magnet 208b may swing the wrapped hanger away from casting elevated portion 163 and to a position where the hanger hook may be engaged at the point of discharge, as explained hereinafter. Thus, there must not be any vacuum to hold the hanger cover to elevated portion 163. With no vacuum applied, the paper is not torn or removed from the hanger it enfolds by the return movement of folder 171. Since magnet 208b must pick the hanger and turn it about an axis described by magnets 208a—208a, its force must be greater than that of magnet 208c. This is assured by covering magnet 208c with a rubber cap which thus spaces the neck of the hanger from the magnet and reduces its effective force. While the vacuum is removed from the station, still the hanger is held securely on the station by magnets 208a—208a, and 208c.

Referring to Figures 29 to 34, the hub 157 of wheel 155 is provided with ten similar but non-interconnected openings 355a, or one opening for each station. Each opening 355a is connected to a related station, as explained hereinafter. Mounted for rotation with hub 157, and pressed thereagainst to affect an air tight seal between it and the hub end, is a vacuum distributor plate 356 having ten similar openings 357 in its face 358 and extending therethrough. Each opening 358 is connected to a corresponding hub opening 355a by an appropriate duct 359 extending parallel to the hub axis. A vacuum chamber cylinder 360 is mounted on shaft 158 and against the face 358 of plate 356. The central opening 361 of cylinder 360, however, is of such diameter as to allow relative rotation between cylinder 360 and shaft 158. An arm 362 is fixed to cylinder 360 at one end, and at its other end it is fixed to a support leg, thereby maintaining the vacuum cylinder stationary as plate 356 and shaft 158 turn.

Referring in particular to Figures 30, 32, and 33, cylinder 360 at its face 363 has a small vacuum chamber 364 extending along an arc of approximately 30 degrees. A second vacuum chamber 365 extends along an arc approximating 210 degrees. The holes 357 in plate 356 are so located therein so as to move along an area of arc encompassing vacuum chambers 364 and 365, to thus provide access whereby the vacuum system is connected to the various folding stations.

The space 366 between vacuum chambers 364, 365, is smaller than the diameter of any hole 357, thereby assuring that a hole 357 passes from in front of chamber 364 to chamber 365, a continual vacuum connection is made to the respective folding station.

Referring to Figure 15, it is seen that chamber 364 starts at a point approximating 30 degrees from the horizontal. This corresponds to a point slightly before the folding stations are fully before the paper cutter mechanism. Thus, vacuum is fully applied to each station by the time the station is directly before the cutter roller, since each plate hole 357, as it passes before chamber 364, connects its respective station to the vacuum system substantially at the same as the station is traveling before the cutter roller assembly.

Two vacuum chambers are used in cylinder 360 for the following reason. It is obvious that as hole 357 and its station reach the point where they respectively connect to the vacuum system and pick up the paper, other stations have preceded them and already have vacuum applied thereto to carry their respective paper cover blanks. To assure that a sufficient vacuum is initially applied to a station, the vacuum chamber 364 is connected through opening 367 and hose 368 to a separate vacuum pump 369 (Figure 3). Only one station at a time is evacuated by chamber 364 and pump 369. Vacuum chamber 365, on the other hand, applies a vacuum to as many as six stations at a time. Evacuation of chamber 365 is accomplished through opening 370 which is connected by flexible hose 371 to a vacuum pump 372. The independent vacuum pumps 369, 372, however, employ a common drive motor 373.

The upper end 374 of vacuum chamber 365 coincides to the point where folder 171 starts its return movement to fully open position. Thus, the vacuum to each station is shut off as its respective plate hole 357 passes chamber end 374. This frees the cover from elevated portion 163 and allows magnet 208b on folder 171 to pivot the covered hanger as the folder returns to open position.

As further seen in Figure 30, a pair of oil duct openings 375, 376, are provided in cylinder 360. Duct 375 lubricates the surfaces between shaft 158 and the inner surface of cylinder 360 opening 361. Duct 376 leads to the face 363 of cylinder 360 to lubricate the wearing surfaces of faces 358, 363, and at the same time provide an effective air-tight oil seal for the vacuum system.

As seen in Figure 29, a collar 377 is mounted on shaft 158. Anchored between collar 377 and the hub portion 378 of cylinder 360 is a compressed spring 379 which acts to urge the respective faces 358, 363, of plate 356 and cylinder 360 close togther.

Each hub opening 355a, as seen in Figures 1 and 4, is connected to its respective folding station by means of a header pipe 380 having branches 381, 382, 383, which are respectively connected to the nozzles 175—175, and 180. A cutoff valve 384 is provided in each header 380. A protruding pivotal handle 385 is supplied on each valve to control its operation. An adjustable stop 386 (Figures 4 and 37) is mounted on support leg 342 at a point where it is engageable with the valve handles 385 as they pass thereby to effect valve opening. As the stations are traveling clockwise, as seen in Figure 4, and the valve handles 385 are in closed position, as shown by the dotted lines, stop arm 387 is positioned to intercept the travel of the handles and move them to open their respective valves. By turning handle 388 and rocking rod 389, arm 387 may be moved to its inoperative position whereat it will not engage the valve handle 385. Rod 389 is supported in a U-shaped frame 390 which is welded to support leg 342. A compressed spring 391 is anchored around rod 389 and between one leg of the frame and a collar 392 attached to rod 389.

When the apparatus is first being started, and no blanks are carried by the stations, all valves 384 are closed, with the exception of the valve leading to the station first to pass the cutter apparatus C. This assures that vacuum will not be applied to stations not carrying blanks. Hence, as the first station picks up its paper and its distributor plate opening 357 moves from before vacuum chamber 364 to chamber 365, sufficient vacuum will be supplied by chamber 365 to hold the paper to the station. On the other hand, if the vacuum was supplied to the other stations and they held no paper, the vacuum to the first station ordinarily would not be sufficient to retain the paper thereon. As succeeding stations move, their valve handles 385 pass an engage arm 387 which moves the handles to open position so that vacuum may be supplied to the stations in readiness when they pass cutter apparatus C and pick up their respective supply of paper.

*Hanger take-off station*

Referring to Figures 1, 2, and 38, fixed adjacent to the path of travel of the stations is a hook shaped catch 393 which is adapted to intercept each hanger support hook as the hangers are pivoted about their lower bars by the return movement of the folders 171. The covered hangers thus are pulled from the stations by the relative travel of the stations from the deposited hangers. Catch 393 is connected to a downwardly directed rod 394 leading to a rotatable shaft 395 having a continuous spiral groove 396 for directing the covered hangers away from the wrapping apparatus. Grooved shaft 395 is supported by and extends between paired legs 397—397 on the frame bed, and is held sufficiently thereabove as to allow the hangers to clear the paper feed apparatus.

Rod 395 at its remote end carries a sprocket wheel 398 which is connected by a chain 399 to a sprocket wheel 400 on a rotatable shaft 401 supported in bracket 402 held on frame member 403. Shaft 401 is driven by a transverse shaft 404 through a right angle gear box 405.

Positioned adjacent to rod 394 is a hanger counter apparatus, generally indicated at 406, which is adapted to group the hangers in groups of fifty in readiness for shipping. The counter apparatus comprises a spring biased stop bar 407 mounted for reciprocable motion in a U-shaped bracket 408 mounted on crossarm 409. Bar 407 carries a stud 410 to which a lever 411 is connected at its slotted end 412. Lever 411 is pivotally connected to a crank arm 413 driven by speed reducer unit 414 which, in turn, is driven by shaft 404. The speed reducer unit 414 is so set that for each fifty revolutions of shaft 404, crank arm 413 makes one complete revolution; although, it is understood, of course, that other ratios, depending upon the number of hangers it is desired to have in a group, may be used.

Stop bar 407 and lever 411 and its slotted end are so designed that while shaft 404 makes forty revolutions, the crank arm 413, through lever 411, maintains stop bar 407 spaced from rod 394. This enables the covered hangers to travel down rod 394 and directly to rotatable shaft 395. During the other ten revolutions of shaft 404, crank arm 413 allows stop bar 407 to rest directly on rod 394 to thus arrest the travel of hangers thereon until the bar is again raised, after which the arrested hangers and the succeeding hangers are free to travel to shaft 395. Thus, the covered hangers on shaft 395 are collected and fed along in groups of fifty with spaced intervals between the various groups. The counted covered hangers then may be removed from shaft 395 and packed for shipping.

*Operation*

For each complete revolution of the shaft 158 which carries the stations, the apparatus turns out that number of covered hangers that there are stations, or, as in the herein described embodiment, ten covered hangers are produced for each complete revolution of shaft 158. To achieve this result, jackshaft 59 is driven by motor 58 through its sprocket wheel 415 and drives shaft 158 through a sprocket wheel 416, chain 417 and large sprocket wheel 418 keyed to shaft 158, with the tooth ratio between wheels 416, 418, being one-to-ten. Thus, jackshaft 59 makes ten complete revolutions for each revolution of shaft 158.

Further, to achieve ten covered hangers for each revolution of shaft 158, it is necessary to synchronize the glue applicator apparatus, hanger feed apparatus, and hanger take-off station by coupling them to jackshaft 59 in such a manner as to have them complete one cycle of operation for each revolution of jackshaft 59. The glue applicator is so coupled to the jackshaft through sprocket 281, chain 282, and jackshaft sprocket wheel 417a, the sprocket wheels 281, 417, being similar in size.

Referring to Figures 3, 4, and 38, drive to the hanger feed and take-off apparatus is supplied through jackshaft sprocket wheel 418a, which turns auxiliary shaft 419, rotatably mounted to the vertical legs 397, through chain 420 and at sprocket wheel 421 similar in size to wheel 418. At the far end of shaft 419, a right angle gear box 422 transmits power to the hanger take-off drive shaft 404 through shaft 423 and gear box 424. A second shaft 425 extends from gear box 422 towards the hanger feed apparatus. Driving power to the hanger feed conveyer 319 is provided through transverse shaft 426, to which the sprocket wheels 324 are mounted, by a right angle gear box 427, which further supplies power to turn hanger support rod 309 through shaft 428, gear box 429, and sprocket wheel 430 which turns wheel 310 by means of a connecting sprocket chain 431.

Since the drive ratio between jackshaft 59 and the various stations is one-to-one, for each revolution of jackshaft 59, the roller 250 and the glue applicator pads make one complete turn to apply glue to one cover blank, rod 309 makes one revolution to meter out one hanger through its feed screw 314, conveyer 319 travels sufficiently to feed one hanger to the stations, and shaft 404 makes one revolution to record one covered hanger at the counter mechanism 406 and to further turn spirally grooved shaft 395.

As best seen in Figure 1, a cam 432 also is provided on jackshaft 59 to control the operation of the paper feed brake solenoid 128. As jackshaft 59 turns, the cam alternately engages and disengages an arm 433 of switch 434, mounted on the frame bed, alternately to close and open the necessary electrical circuiting to energize and de-energize solenoid 128. Cam 432 is so designed as to engage switch arm 433 to energize solenoid 128 only during that period of time when it is desired to prevent paper feed. At the other times, switch 434 remains open to allow the paper to be pulled over table 119.

A complete cycle of station operation is as follows. As the station nears the cutter station D, switch arm 433 becomes disengaged from cam 432, allowing switch 434 to break the electrical circuiting with paper brake solenoid 128. At the same time, the particular opening 357 in vacuum distributor plate 356, leading to the station, becomes aligned with vacuum chamber 364, allowing a vacuum to be applied to the station. The paper thus is pulled to the station which carries it past cutter roller 213 to form the hanger cover blank 225. After the blank has been cut, jackshaft 59 has rotated sufficiently to allow the cam to again close switch 434 through its arm 433 until the next succeeding station has traveled to a position where it may pick up paper.

The paper blank 225 next travels past the glue applicator station where glue is applied to areas 256, 257, 258, 259. As the station nears the hanger feed apparatus E, a hanger is fed by conveyor 319 over stripper plate 334. The hanger lower bar is picked up by the station magnets 208a—208a, and the hanger is lifted from the stripper plate, while its shoulder portions swing about the lower bar until they rest on the portion of blank 225 on casting elevated portion 163. At this point the station cam followers 348, 353, engage cam plate surfaces 340, 339, respectively, to cause the folders 193—193, and 171 to fold the cover blank over the hanger shoulder bars and lower bar. As seen in Figures 15 and 16, the folders 171, 193—193, in their respective inoperative positions, are substantially level with the face of elevated portion 163. As the folders pivot up and over the hanger sides, however, they act to center the hanger with respect to its cover blank, if the magnets 208a—208a do not hold the hanger accurately thereon. The obliquely positioned folders 193—193 first act against the hanger shoulder bars to center the hanger on the cover blank, and thereafter the relatively timed folder 171, as it pivots, acts against the hanger lower bar to correctly position the hanger whereby its three sides substantially coincide with the sides of cover blank triangular body portion 225b. While the station magnets 208a—208a hold the hanger thereto, the hanger still is permitted to move relative to the magnets for proper positioning by the action of the folders 171, 193—193. The continued movement of the folders, of course, to their respective closed positions, as shown by the phantom lines in Figures 15 and 16, folds the cover blank body portion 225a and foldable portions 225c, 225d over the hanger sides and presses them to the areas of glue to secure the cover on the hanger.

As the folder 171 starts its return movement, the vacuum distributor plate hole 357 passes the end 374 of vacuum chamber 365, and vacuum no longer is applied to the station. This allows folder 171 and its magnet 208b to swing the covered hanger about its lower bar until the hanger hook engages catch 393 which holds the hanger as the station continues its travel. Once free of the station and magnets 208a—208a, the covered hanger travels down rod 394. The station, in the meanwhile continues its travel towards the paper feed platen assembly 135 to pick up its next supply of paper.

This action is repeated at each station, so that ten covered hangers are produced for each revolution of shaft 158.

By way of illustrating the advantages of the herein described machine, the apparatus allows considerable savings, both by increasing machine productivity and by eliminating the hand labor previously required. Using the mechanisms and methods preceding the instant invention, separate and additional machinery was required to form the hanger cover blanks, and more often than not hand labor was required to enfold the hangers in the covers. Advantageously, the new apparatus, with shaft 158 turning at only ten revolutions per minute, can produce 6,000 wrapped hangers per hour while requiring the attention of no more than one attendant who takes care of the paper supply roll, supplies hangers to rod 309, and removes the covered hangers from rod 395. On an eight hour a day basis, 48,000 covered hangers may be produced while expending merely eight man hours of work. Even at the comparatively low rate of ten revolutions per minute by shaft 158, the great savings made possible by the present invention are manifest.

The apparatus also is capable of receiving its paper feed from a synchronized rotary printing press, which imprints desired advertising matter on the paper in preparation of the paper being wrapped over the hangers.

It is to be distinctly understood that the apparatus shown and described herein is a preferred embodiment which has been given by way of example only, and that various changes and rearrangements of the details shown may be made without departing from the spirit of the invention, the scope of which is defined in the appended claims.

What is claimed is:

1. A machine for covering wire garment hangers, comprising: a wrapping station; power driven transfer means for periodically advancing a web of paper to said station; means including suction ports on said station for receiving the leading portion of said paper web and holding it to said station; knife edges mounted on said station, extending perpendicular to and slightly above the face thereof, and arranged to define a substantially triangularly shaped cover blank having foldable areas at edges thereof; first means for pressing the paper against said knife edges and cutting a cover blank from the paper; second means for applying an adhesive to predetermined areas of said cover blank; power driven transfer means for periodically delivering a triangularly shaped wire garment hanger having shoulder and lower bars into juxtaposition with said station; magnets on said station for securing said hanger on said cover blank whereby each hanger bar is adjacent to a foldable area; pivotal arms on said table, one for each foldable area and adapted to fold the same over the adjacent hanger bar and effectively secure the foldable area in its folded condition; third means controlling the operation of said pivotal arms; and synchronizing means for relatively timing the operation of said transfer means, and said first, second, and third means, whereby a covered hanger is produced at said station during each cycle of machine operation.

2. A machine for covering triangularly shaped garment hangers, comprising: a station having a flat surface for receiving a continuous wrapper sheet periodically fed thereto; means associated with said station for receiving said sheet and holding it thereon; knife edges mounted on said station perpendicular to said surface, extending slightly thereabove, and arranged to cut from said sheet a cover blank having a body portion substantially the shape of said hangers and foldable areas at the body portion edges; means for pressing said wrapper sheet to said knife edges and cutting said cover blank from said sheet; means for periodically delivering a hanger to said station; means on said station for receiving the hanger and locating it on said cover blank coincidental with the body portion thereof; means operatively associated with said station to fold the cover blank foldable areas over the hanger sides and secure the foldable areas in folded condition, and synchronizing means for relatively timing the different operations, whereby a covered hanger is produced at said station during each cycle of machine operation.

3. A machine for covering substantially triangularly shaped garment hangers, comprising: a wrapping station; means for periodically feeding the lead portion of a paper web to said station; means on said station for receiving said lead portion and holding it thereon; knife edges mounted perpendicular to the face of said station, extending slightly thereabove, and arranged to cut from each lead portion fed to said station a cover having a body portion substantially the shape of said hangers and a foldable portion at each edge adapted for folding over the edges of a hanger; first means for pressing said paper lead portion to said knife edges and cutting a cover blank from the paper; second means for applying an adhesive to said cover blank at predetermined areas adjacent to the edges of its body portion; means for periodically feeding a hanger to said station; means on said station for receiving the hanger and locating it on said cover blank coincidental with the body portion thereof; third means operatively associated with said station to fold the foldable portions over the hanger edges and press the areas of adhesive to unglued areas, thereby securing the foldable portions in folded condition; and means for relatively timing the operation of said paper web and hanger feed means and said first, second, and third means, whereby a covered hanger is produced at said station during each cycle of machine operation.

4. Apparatus for covering wire garment hangers, comprising: a rotatable carriage having a plurality of spaced wrapping stations thereon; transfer means for feeding a paper web to successively passing stations; transfer means for delivering a hanger to successively passing stations; each station having means for holding that portion of the paper web fed thereto; knife edges for cutting a cover blank from said portion, magnets for holding the hanger fed thereto on a respective cover blank, and mechanism for folding portions of said cover blank over the edges of said hanger to enfold the hanger in a cover; means cooperable with said knife edges to effect cutting of said blank; means operatively associated with said mechanism to effect the folding action; means engageable with the covered hangers to effect removal thereof from their respective stations; and means synchronizing the operation of said transfer means with the demand for paper and hangers at said stations, whereby a covered hanger is produced at each station during each cycle of carriage movement.

5. Apparatus for covering garment hangers, comprising: a rotatable wheel having a plurality of spaced wrapping stations thereon, each for receiving a portion of a paper web and a hanger fed thereto; each station having vacuum ports for holding that portion of the paper web fed thereto, cutting edges mounted thereon for severing a cover blank from said portion, means for holding the hanger fed thereto on said cover blank, and mechanism for folding portions of said cover blank over the edges of said hanger; means along the path of station travel and cooperable with said cutting edges to effect severing of said blank from said web portion; means along said path of travel for applying an adhesive to said blank to effect sealing of the cover blank folded portions over the hanger edges; means along said path of travel and operatively associated with said mechanism to effect the folding action; means along said path of travel for removing covered hangers from successively passing stations; and means for selectively applying vacuum to said stations and removing it therefrom.

6. Apparatus for covering garment hangers, comprising: a rotatable carriage having a plurality of spaced stations thereon, each station adapted to receive a portion of a paper web and a hanger fed thereto; each station having means operatively connected therewith for holding that portion of the paper web fed thereto, knife edges for cutting a cover blank from said portion, means for holding the hanger fed thereto superposed on said cover blank, and mechanism for folding portions of said cover blank over the edges of said hanger; means along the path of station travel and cooperable with said knife edges to effect cutting of said blank; means along said path of travel and operatively associated with said mechanism to effect the folding action; and means along said path of travel for receiving the covered hangers from the successively passing stations.

7. Apparatus for covering garment hangers, comprising: a movable carriage and a wrapping station carried thereby; means for periodically advancing a paper web to said station; means associated with said station for receiving the lead portion of said paper web and holding it thereon; knife edges associated with said station, extending substantially perpendicular to the face thereof, and arranged to cut from said lead portion a cover blank having a first body portion substantially similar in size and shape to that of said hangers, flaps along two sides of the triangularly shaped body portion and a second body portion complementary with the first body portion at the base thereof; means for urging said lead portion against said knife edges and cutting a cover blank from said lead portion; means for periodically delivering a hanger to said station; means on said station for receiving the hanger and locating it on said cover blank coincidental with the first body portion thereof; means operatively associated with said station to fold the cover blank flaps over their respective hanger sides and secure the flaps in folded condition; means for folding the second body portion into position over the first body portion; and synchronizing means for relatively timing the aforementioned operations, whereby a covered hanger is produced at said station during each cycle of apparatus operation.

8. Apparatus for covering triangularly shaped garment hangers, comprising: a continuously moveable carriage carrying at least one wrapping station having a flat surface for receiving a web of paper periodically fed thereto; means associated with said station for receiving the lead portion of said web and holding it thereon as the station continues its travel; knife edges mounted on said station, extending perpendicular to the surface thereof, and arranged to cut from said lead portion a cover blank having a first body portion substantially similar in size and shape to that of said hangers, and further having covering areas, one at each leg of the triangularly shaped body portion and a body portion covering area at the base edge of the first body portion; means juxtaposed to the path of station travel and cooperable with said station for urging the web lead portion against said knife edges, whereby a cover blank is cut from lead portion; means juxtaposed to the path of station travel for applying an adhesive to said cover blank at predetermined areas adjacent to the edges thereof; mechanism for periodically delivering a garment hanger into juxtaposition with the path of station travel; means on said station for receiving said hanger and locating it on said cover blank coincidental with the body portion thereof; means, including a pivotal arm for each hanger covering area, operatively associated with said station to fold said covering areas over adjacent hanger sides, press the areas of adhesive to unglued areas, and thereby secure the covering areas in folded condition; means juxtaposed to the path of station travel and positioned to engage the covered hanger on said station to remove the same as the station continues its travel; and means synchronizing the aforementioned operations, whereby a covered hanger is produced at said station during each cycle of apparatus operation.

9. Apparatus for covering wire garment hangers, comprising: a rotatable carriage including a wrapping station carried thereby; means for advancing a web of paper to said station in timed relation to the travel thereof; means including a suction port on said station for receiving the leading portion of said paper web and holding it to said station; means for applying a vacuum at said suction port; knife edges carried by said station, extending perpendicular to the face thereof, and arranged to define a substantially triangularly shaped cover blank having a foldable flap at each edge thereof; a roller juxtaposed to the path of station travel and cooperable with said knife edges as they pass thereover to sever the cover blank from said paper web as the station passes thereby; glue applicator means synchronized to the station travel and juxtaposed to the path of travel thereof for applying glue to predetermined areas of the cover blank as the station passes thereby; mechanism synchronized to the station travel and juxtaposed to the path of travel thereof for feeding a hanger to said station as the station passes thereby; magnets carried by said station for receiving the hanger fed thereto and securing it on said cover blank; three pivotal flaps carried by said station for folding the flaps of the cover blank over the shoulder and lower bars of said hanger and pressing the glue areas to effectively secure said hanger within its cover; means controlling the operation of said pivotal flaps as said station moves towards a point of hanger discharge; and means at said discharge point engageable with the covered hanger to remove the hanger from the station as the station continues towards a new flight.

10. Apparatus for covering garment hangers, comprising: a plurality of movable hanger wrapping tables arranged in spaced relation to each other to form an endless train; transfer means for withdrawing paper from a supply thereof and delivering said paper to successive tables; means on each table for receiving said paper and holding it thereto; knife edges arranged to cut from the paper held at each of said tables a cover blank having a body portion complementary to the bodies of the hangers to be covered and flaps foldable over the sides of said hangers; means cooperable with said knife edges to effect said cutting action; transfer means for feeding hangers, one for each passing table, into juxtaposition with the path of travel by said tables; means on each of said tables for receiving and locating the hanger fed thereto coincidental with the respective body portion of the cover blank thereon; mechanism associated with each of said tables for effecting folding of said flaps over the sides of said hangers, thereby to secure the hangers in their respective covers; and means relatively timing the aforementioned operations, the operations at the successive tables being at different stages of progress, with all operations occurring substantially concurrently, whereby a covered hanger is produced at each of said tables during each cycle of table travel.

11. The apparatus described in claim 10 wherein the hanger transfer means includes an endless conveyor; a stripper plate adjacent the end of conveyor flight adapted to receive the hangers therefrom and locate the successive hangers at a position whereat their lower spans will be picked up by the hanger receiver means on successive passing tables; means on said conveyor to hold said hangers thereon in spaced relation to each other as the hangers travel towards said plate; a rotatable rod for suspending the hangers therefrom by their hooks, said rotatable rod being positioned above the endless conveyor to locate the hanger lower spans substantially at the level of said conveyor at its start of flight, whereby said lower spans are received by the conveyor hanger holding means, said rotable rod further having means for metering hangers to said endless conveyor in timed relation to the travel thereof; and a stationary rod for guiding the hooks and shoulder spans of said hangers to a position of repose on said endless conveyor.

12. The apparatus described in claim 10 wherein the paper transfer means includes cooperable pressure rollers for drawing the paper from a roll thereof; a stationary table for threading the paper web towards a position juxtaposed to the path of table travel; means controlling the operation of said pressure rollers and maintaining a supply of slack paper between said stationary table and said paper roll, whereby the paper experiences no undue tension as it travels towards said wrapping tables; a brake bar mounted above said table and movable towards said stationary table to clamp the paper thereto, thereby to prevent unnecessary paper feed to the wrapping tables; and means synchronizing the operation of said brake bar with the travel of said wrapping tables.

13. The apparatus described in claim 10 and additionally including a glue fountain having a roller with means thereon positioned to apply glue to predetermined areas of the successively passing cover blanks adjacent the edges thereof, whereby the cover blank flaps are sealed in folded condition by the folding action of said mechanism, and means synchronizing said glue fountain roller with the travel of said tables.

14. Apparatus as described in claim 10 wherein the means on each of the tables for holding the paper thereto includes suction ports, and additionally including a vacuum pump, and valve means for selectively applying vacuum at the suction ports on said tales and for selectively removing the vacuum therefrom, whereby vacuum is successively applied to each of said tables in anticipation of receiving the paper thereat and is successively removed from each of said tables preliminary to releasing the covered hangers therefrom.

15. Apparatus for covering wire garment hangers, comprising: a plurality of wrapping tables arranged on a rotatable carriage in spaced relation to each other to form an endless train; transfer means for withdrawing paper from a supply thereof and delivering said paper to a position juxtaposed to the path of travel of said tables; suction ports on each table for receiving said paper and holding it thereto; knife edges arranged to cut from the paper at each of said tables a cover blank having a pair of substantially triangular portions joined at their base, foldable thereat to a position complementary to the bodies of the hangers to be covered, and a pair of foldable flaps joined to the sides of one of said triangular portions; means cooperable with said knife edges to effect said cutting action at each of said tables; a glue applicator roller juxtaposed to said path of travel to apply glue to predetermined areas adjacent the edges of the cover blanks carried by the successive tables passing thereby; transfer means for feeding wire hangers, one of each passing table, into juxtaposition with said path of travel; magnets on each of said tables for receiving and locating the hanger fed thereto coincidental with and superposed on said one of the triangular portions of the cover blank thereon; mechanism on each of said tables, including a pair of pivotal arms, each positioned to underlie a respective one of said cover blank flaps, and a pivotal triangularly shaped member positioned to underlie the other of said triangular portions; linkage on each of said tables including a pair of cam followers connected with said arms and said member on the respective table to cause pivoting thereof, folding of said flaps and said other triangular portion over the sides of a hanger, and subjection of said glue areas to pressure, whereby the hanger is secured in its cover; a pair of stationary cam surfaces positioned along said path of travel, one for each cam follower of said pairs thereof and engageable thereby to effect actuation of said linkage on the successively passing tables; a vacuum pump; means for selectively applying vacuum to each of said tables at the ports thereof and for selectively removing the vacuum therefrom; and means relatively synchronizing the aforementioned operations, whereby a covered hanger is produced at each of said tables during each cycle of table travel.

16. Apparatus for covering garment hangers, comprising: a plurality of wrapping tables arranged on a rotatable carriage in spaced relation to each other to form an endless train; transfer means for withdrawing paper from a supply thereof and delivering said paper to a position juxtaposed to the path of travel of said tables; means on each table for receiving said paper and holding it thereto; a glue applicator roller juxtaposed to said path of travel and having means thereon for applying glue to predetermined areas of the paper carried by the successive tables passing thereby; transfer means for feeding hangers, one for each passing table, into juxtaposition with said path of travel; means on each table for receiving and locating the hanger fed thereto superposed on the paper thereon; mechanism associated with each of said tables for folding said paper over the paired shoulder and lower spans of the respective hanger thereon, pressing the areas of glue to unglued areas, and securing the paper covers on said hangers; and means relatively timing the aforementioned operations, the operations at the successive tables being at different stages of progress, with all operations occurring substantially concurrently, whereby a covered hanger is produced at each of said tables during each cycle of table travel.

17. The apparatus described in claim 16 wherein said mechanism includes three flaps pivotally arranged on each of said tables to fold the paper thereon over the sides of the respective superposed hanger thereon; linkage including a cam follower on each of said tables to control the operation of paired pivotal flaps enfolding paper over the paired shoulder spans of a hanger; and second linkage including a second cam follower on each of said tables to control the operation of the third pivotal flap enfolding paper over the lower span of a hanger; and a pair of cam surfaces mounted alongside the path of table travel, one for each cam follower and engageable thereby to effect actuation of said linkage.

18. Apparatus for covering wire garment hangers, comprising: a continuously movable endless carriage carrying a plurality of spaced wrapping stations; mechanism for supplying a paper web to successive stations passing thereby; means on each station for receiving the paper and holding it thereto; knife edges carried by each station, extending substantially perpendicular to the face thereof, and arranged to define a substantially triangularly shaped cover blank having three covering areas; means juxtaposed to the path of station travel and cooperable with said knife edges to sever a cover blank from said paper web on each of the successive stations passing thereby; a glue fountain system having glue applicator means juxtaposed to the path of station travel for applying glue to areas of the cover blanks carried by successively passing stations; mechanism for feeding hangers one to each station as the successive stations pass thereby; magnets carried by each station for receiving the hanger fed thereto on a cover blank carried thereby; pivotal arms carried by each station for folding the covering areas of the respective cover blank held thereto over the shoulder and lower bars of the respective hanger thereon and sealing the hanger within its cover; means controlling the operation of said arms as the successive stations move in their flight; and means juxtaposed to the path of station travel for engaging the hook portions of covered hangers on the successively passing stations to remove the covered hangers therefrom as the stations continue towards a new flight.

19. Apparatus for covering wire garment hangers, comprising: a continuously movable carriage carrying a plurality of spaced wrapping stations in an endless train thereof; mechanism for supplying a paper web to successive stations passing thereby; means on each station including suction ports for receiving and holding successive lead portions of said web; vacuum producing means connected to said suction ports; knife edges mounted on each station, extending perpendicular to the face thereof, and arranged to cut from the respective lead portions a cover blank having a substantially triangular body portion similar in size and shape to said hangers, and further having a foldable covering area at each side of the body portion; a roller juxtaposed to the path of travel of said stations, positioned to press the lead portions against the respective knife edges on said stations as they pass successively thereby, thereby to cut a respective cover blank at each station; glue applicator means juxtaposed to said path of travel for applying an adhesive to areas of said cover blanks adjacent to the edges thereof as successive stations pass thereby; continuously operating transfer means for delivering wire hangers, one for each passing station, into juxtaposition with said path of travel; means including magnets on each station for receiving the hanger fed thereto and holding it against the body portion of the cover blank carried thereby; three pivotal arms carried by each station, positioned to fold a respective cover blank covering area over a hanger edge adjacent thereto, press the areas of adhesive to unglued areas, and secure the covering areas in folded condition; means operatively associated with each station for controlling the action of said pivotal arms in timed relation to the travel of the successive stations; means juxtaposed to said path of travel and engageable with the hook portions of successively passing covered hangers to remove the covered hangers from the stations; means associated with each station for selectively applying vacuum thereto in preparation for receiving the paper web and for selectively shutting off the vacuum in preparation for removal of a covered hanger therefrom; and means for synchronizing the aforementioned operations, whereby a covered hanger is produced at each station during each cycle of carriage movement.

20. Apparatus for covering wire garment hangers, comprising: a rotatable wheel carrying a plurality of spaced wrapping stations thereon in an endless train; transfer means for advancing a web of paper towards said stations, including means for feeding the paper from a roll thereof, a platen for bringing the paper into juxtaposition with the path of table travel, and means controlling the operation of said paper feed means and maintaining a supply of slack paper between said platen and said roll, whereby the paper experiences no undue tension as it is pulled over said platen; each station having suction ports adapted to receive the lead portion of said paper web at said platen, hold the paper to the respective station, and allow the moving station to pull said paper from said slack supply thereof to said platen in readiness for the succeeding station, and cutting edges extending perpendicular to the station face and across the width of said paper web, and arranged to cut therefrom a triangular cover blank having three foldable covering areas; a spring biased roller adjacent the path of table travel and engageable with said cutting edges to sever a cover blank from said paper web on each passing station; a glue applicator roller adjacent the path of travel of said stations and engageable with the respective cover blanks thereon to apply glue to areas adjacent to the edges of said cover blanks; an endless conveyor for periodically bringing wire garment hangers, one for each passing station, into juxtaposition with the path of station travel; means supplying hangers to said conveyor; each station further having magnets for receiving and holding the respective hanger fed thereto on said cover blank, and mechanism, including three pivotal arms for folding the hanger covering areas of the respective cover blank thereon over the edges of said hanger and effect securing thereof within its cover; means for controlling the operation of said arms as each station continues its flight; a catch juxtaposed to said path of travel and engageable by the hook portions of the covered hangers to remove the same from the passing tables; means synchronizing the operation of said conveyor and said applicator roller with the travel of said stations.

21. Apparatus for covering wire garment hangers, comprising the combination with means for paying out paper from a roll thereof, of a rotatable wheel carrying a plurality of spaced wrapping stations adapted to successively receive the paper thereat, each station including suction ports for pulling the paper thereto and holding it thereon, knife edges extending perpendicular to the station face and arranged to cut from the paper held thereon a cover sheet having flaps adapted for folding about the body of a hanger, and magnets for receiving a hanger and holding it on said cover sheet; a roller adjacent to the path of station travel and cooperable with said knife edges as they pass thereover to sever cover sheets from the paper on successively passing stations; an endless conveyor for delivering wire garment hangers, one to each station, as the stations pass thereby, said conveyor including spaced bars, magnets on said bars for holding the hangers thereon, and a plate at the end of the conveyor flight positioned to receive the leading edge of successive hangers, strip the hangers from the moving conveyor, and bring the successive hangers into a position whereat they will be picked up by the magnets on successively passing stations; means supplying hangers to said conveyor, including a rotating rod for supporting the hanger hooks and having a screw feed for metering hangers to the conveyor bars in timed relation to the travel thereof, means for guiding the hanger body portions as they approach said conveyor, and means for guiding the hanger hooks to a position of repose on said conveyor; mechanism, including pivotal arms on each station adapted to fold the flaps of the respective cover sheet thereon over the respective hanger thereon and secure the hanger in its wrapper; means along the path of station travel and cooperable with said mechanism to effect said folding action as successive stations pass thereby; a catch adjacent said path of travel and engageable by the hooks of the covered hangers to remove the same from the passing stations; and means synchronizing the operation of said conveyor with the travel of said stations.

22. In apparatus for covering garment hangers, including a movable wrapping station having means for holding paper thereto, means for locating a hanger on the paper, and mechanism for enfolding the hanger body in a cover, the improvement comprising: cutting knives mounted on said station, extending perpendicular to the face thereof, and arranged to cut a cover blank having covering areas foldable over the sides of the hanger body, a roller positioned adjacent the path of station travel to press the paper against said cutting knives and form said cover blank, and a second roller positioned adjacent said path of travel to apply glue to predetermined areas of said cover blank to effect securing thereof over said hanger body during the enfolding operation, and means synchronizing said second roller to the travel of said station.

23. The apparatus of claim 22, and additionally including a stop rail carried by said station above the face thereof, and cylindrical surfaces, one mounted coaxially with each of said rollers and positioned to engage said rail to limit the effective thrust of said rollers towards said station.

24. Apparatus for covering wire garment hangers, comprising: a rotatable wheel; a plurality of uniformly spaced wrapping tables carried by said wheel; power driven transfer means for periodically advancing a paper web towards said tables; a platen for receiving said web and bringing the foremost portion thereof into juxtaposition with the moving tables; each table having ports for successively receiving the paper from said platen and holding it to the respective table, spring biased knife edges mounted thereon, extending perpendicular and slightly above the respective face thereof, and arranged to cut from the paper held thereon a hanger cover sheet having two similarly shaped substantially triangular portions jointed at their base and a pair of foldable flaps joined one to each side of one of said triangular portions, each table further having magnets for receiving and locating a hanger superposed on said one of the triangular portions of the cover sheet thereon, a pair of arms pivoted thereto, each arm being positioned thereon to underlie a respective one of the cover sheet flaps, a triangularly shaped member pivoted to each table and positioned thereon to underlie the other of the triangular portions of the cover sheet, and linkage including a pair of cam followers connected with said arms and said member to cause pivoting thereof to fold said flaps and said other triangular portion over the sides of a hanger; roller means positioned adjacent the path of travel of said tables and adapted to press the paper held thereto against said knife edges, thereby to cut hanger cover sheets on the successively passing tables; a glue fountain system having an applicator roller positioned adjacent said path of travel for applying glue to predetermined areas adjacent to the edges of the cover sheets on successively passing tables; an endless conveyor for delivering wire hangers into a position whereat the successive hangers are received by the respective magnets on the successively passing tables; a pair of stationary cam surfaces positioned along said path of table travel, one for each cam follower of said pairs thereof and engageable thereby to control operation of said linkage on the successively passing tables; and a catch adjacent said path of travel and engageable by the hooks of covered hangers on the successive tables to remove the covered hangers therefrom.

25. Apparatus for covering substantially triangular shaped garment hangers, comprising: a plurality of wrapping tables, each for receiving a paper sheet and a hanger thereon; a rotatable carriage mounting the tables thereon in spaced relation to each other; suction ports on each table whereby successive tables receive the paper and hold it thereto; knife edges mounted on each table, extending perpendicular to the face thereof, and arranged to cut from the paper sheet held thereto a hanger cover blank having a body portion and three flaps adapted for folding over the three sides of a hanger body; roller means positioned adjacent the path of travel of said tables to press the paper held thereto against the knife edges, thereby to cut the cover blanks from the paper on the successively passing tables; conveyor means delivering hangers, one to each passing table, into juxtaposition with said path of travel; magnets carried by each table for receiving the respective hanger fed thereto and holding it superposed on the body portion of the cover blank thereon; paired arms pivoted to each table for folding paired flaps over the shoulder bars of a hanger; a third arm pivoted to each table for folding a third flap over the third bar of a hanger; linkage on each table including a pair of cam followers connected one to said paired arms and the other to said third arm to cause pivoting of said arms and folding of the cover blank flaps over the sides of the respective hanger thereon; a pair of stationary cam surfaces positioned along said path of table travel, one for each cam follower of said pairs thereof and engageable thereby to effect operation of said linkage on the successively passing tables; a catch positioned adjacent said path of travel to be engaged by the hooks of covered hangers for removal of the hangers from the successive tables passing thereby; and means synchronizing said hanger conveyor means with the travel of said tables.

26. The apparatus as described in claim 25 wherein said hanger conveyor means includes a continuously movable endless conveyor carrying magnets to hold the hangers thereon; a plate adjacent the end of conveyor flight, positioned to receive the successive hangers thereat, strip the hangers from the moving conveyor as the same starts its return flight, and locate the successive hangers at a position whereat they will be picked up by the magnets on sucessively passing tables; a rotating rod positioned above said endless conveyor, supporting the hangers by their respective hooks, and having a screw feed for metering hangers to said endless conveyor in timed relation to the travel thereof; means guiding the hanger body portions to a position whereat the third bars thereof are received foremost on said endless conveyor; and means guiding the hanger hooks to a position of repose on said conveyor.

27. The apparatus as described in claim 25, and additionally including a glue fountain system including glue roller means positioned adjacent to said path of table travel and having applicator means thereon for applying glue to predetermined areas adjacent to the edges of the cover blanks on successively passing tables, thereby to secure said flaps in folded condition, and means synchronizing the rotation of said glue roller means with the travel of said tables.

28. Apparatus as described in claim 27, wherein the tables each carry a rail segment above the surface thereof and extending to adjacent rails on adjacent tables, thereby to form a continuous track, and additionally including cylindrical surfaces, one mounted coaxially with each of said roller means and positioned to engage said track, thereby limiting the effective pressure of said roller means against said tables.

29. The apparatus of claim 25, and additionally including a magnet carried by the third pivotal arm on each of said tables and positioned to engage the neck portions of the respective hangers thereon, whereby said third arms, as they return to a normally inactive position, pivot the covered hangers on said tables to an upstanding position whereat the hangers engage said catch as the successive tables pass said catch.

30. The apparatus as described in claim 25 and additionally including a rotatable vacuum distributor plate having extending therethrough a circular array of openings, one for the suction ports on each of said tables; means synchronizing the rotation of said plate with the travel of said tables; conduits connecting the suction ports of each table to their respective plate opening; a stationary member having on one face a vacuum chamber extending on a circumferential arc congruent with said openings and in abutting relationship thereto, the arc of said chamber being of predetermined length to selectively apply vacuum to said tables and selectively remove the vacuum therefrom, and a vacuum pump connected with said chamber.

31. Apparatus as described in claim 25 and additionally including an elongated continuously rotatable spirally grooved rod for suspending the covered hangers therefrom by their hooks and transporting the same away from the tables; a stationary rod leading from said catch downwardly to said rotatable rod; a reciprocably mounted stop positioned adjacent said stationary rod; counter mechanism having an arm connected with said stop for movement thereof towards the stationary rod to intercept the hanger hooks thereon at predetermined times for predetermined intervals, whereby the hangers suspended from said rotatable rod are gathered thereon in groups of predetermined numbers; and means synchronizing said counter mechanism with the travel of said tables.

32. In apparatus for covering garment hangers, a plurality of work supporting stations, each station having means for holding paper thereon, and knives arranged thereon to define a cover blank to be cut from said paper having a body portion complementary to the body of a hanger fed thereto and foldable areas adapted for folding over the sides of said hanger; a glue fountain system having a glue applicator roller with means thereon to apply glue to predetermined areas of said cover blank; a rotatable carriage carrying said stations in spaced relation to each other to form an endless train of stations, said carriage being proximal to said glue applicator roller to sweep the cover blanks on said stations over said glue applicator roller to apply glue to said predetermined cover blank areas; and means synchronizing the operation of said glue applicator roller with the travel of said stations.

33. Apparatus for covering wire garment hangers, comprising: a rotatable carriage having a plurality of spaced wrapping stations thereon; transfer means for feeding a paper web to successively passing stations; transfer means for delivering a hanger to successively passing stations; each station having means for holding that portion of the paper web fed thereto, knife edges for cutting a cover blank from said portion, magnets for holding the hanger fed thereto on a respective cover blank, and mechanism for folding portions of said cover blank over the edges of said hanger including pivotal arms normally positioned below said portions of said cover blank, adapted to align the hanger on said cover blank during the folding operation, and thereafter secure said portions in folded condition; means cooperable with said knife edges to effect cutting of said blank; means operatively associated with said mechanism to effect the folding action; means engageable with the covered hangers to effect removal thereof from their respective stations; and means synchronizing the operation of said transfer means with the demand for paper and hangers at said stations, whereby a covered hanger is produced at each station during each cycle of carriage movement.

34. A machine for covering wire garment hangers, comprising: a wrapping station; power driven transfer means for periodically advancing a web of paper to said station; means including suction ports on said station for receiving the leading portion of said paper web and holding it to said station; knife edges mounted on said station, extending perpendicular to and slightly above the face thereof, and arranged to define a substantially triangularly shaped cover blank having foldable areas at edges thereof; first means for pressing the paper against said knife edges and cutting a cover blank from the paper; second means for applying an adhesive to predetermined areas of said cover blank; power driven transfer means for periodically delivering a triangularly shaped wire garment hanger having shoulder and lower bars into juxtaposition with said station; magnets on said station for holding said hanger on said cover blank whereby each hanger bar is adjacent to a foldable area; pivotal arms on said station, one for folding each foldable area, positioned normally therebelow, and cooperative with the other arms to align said hanger on said cover blank during the folding operation, said arms further being adapted to fold said foldable areas over the bars of said hanger, press said areas of glue to unglued areas, and secure said foldable areas in folded condition; third means controlling the operation of said pivotal arms; and means synchronizing the several operations.

35. In apparatus for covering wire hangers, a rotatable carriage; a plurality of spaced work supporting stations mounted on said carriage; a rotatable glue applicator roller mounted proximal to the path of travel of said stations and having means for applying glue to predetermined areas of hanger cover blanks carried by said stations; means synchronizing the rotation of said roller with the travel of said stations; each station having means for holding a cover blank thereto, magnets for receiving and holding a hanger thereon, pivotal arms for aligning said hanger on said cover blank, folding portions of said cover blank over the sides of said hanger, and pressing said portions to the predetermined areas of glue on said cover blank, thereby to secure said portions in folded condition.

36. A machine for automatically covering garment hangers, comprising: a station including a work surface having means associated therewith for periodically receiving and retaining a hanger cover sheet fed thereto; cutting edges arranged with respect to said work surface to cut a hanger cover blank, including a substantially triangular body and foldable flap portions, from the cover sheet held to the surface; means cooperable with said cutting edges and effective to impress said edges against said sheet and cause the cutting action; means for periodically delivering a hanger to said station; means arranged with said surface for receiving the hanger and locating it on the cover blank coincidental with the body portion thereof; means operatively associated with said station to fold the cover blank flap portions over corresponding hanger sides and secure the flap portions in folded condition; and means for relatively timing the different operations whereby a hanger is covered at said station during each cycle of machine operation.

37. A machine for automatically covering garment hangers, comprising: a work station and means for moving the same along a path past different work stages; means at a first stage for transferring hanger cover sheet material to said station; means associated with said station for receiving said cover sheet material and retaining the same on said station; cutting edges arranged with respect to the work surface of said station to cut a hanger cover blank, including a body portion substantially complementary to a hanger body and foldable flap portions, from the cover sheet material; means at a second stage cooperable with said cutting edges and effective to impress said cutting edges against the sheet material and cause the cutting action; means at a third stage for delivering a hanger to said station; means arranged on said station for receiving the hanger and locating it on the cover blank substantially coincidental with the body portion thereof; mechanism operatively associated with said station for folding the cover blank flap portions over corresponding hanger sides and securing the flap portions in folded condition; means at a fourth stage cooperable with said mechanism to effect the folding action; and means at a fifth stage for receiving the covered hanger.

38. The machine described in claim 37 and additionally including at a stage intermediate said second and said third stages, means for applying adhesive to strategic areas of said cover blank to maintain the flap portions thereof in folded condition.

39. The machine described in claim 37 wherein said mechanism includes pivotal arms arranged for accurate aligning of said hanger on the cover blank body portion, and for folding said flap portions over corresponding hanger sides.

40. The machine described in claim 37 wherein the means for receiving and retaining the cover sheet material on the station includes vacuum ports, a vacuum source and means for applying vacuum to the ports contemporaneously with the station passing the first stage, and for removing vacuum at the ports prior to the station passing the fifth stage, whereby the covered hanger is removable from the station without danger of tearing its cover.

41. A machine for automatically covering garment hangers, comprising: a station adapted to receive hanger cover sheet material and a hanger fed thereto, said station including a work surface having means associated therewith for receiving and retaining the cover sheet material, and means for receiving and locating the hanger on said cover sheet material; cutting edges arranged with respect to said work surface to cut a hanger cover blank, including foldable flap areas, from said sheet material; means cooperable with said cutting edges and effective to impress said edges against said sheet material and cause the cutting action; means operatively associated with said station to fold the cover blank flap areas over sides of said hanger and enfold the hanger body in its cover; and means for relatively timing the operations whereby a hanger is covered at said station during each cycle of machine operation.

42. A machine for automatically covering garment hangers, comprising: a carriage having a plurality of spaced wrapping stations thereon; means for driving the carriage; means for delivering hanger cover sheet material to the work surfaces of successively passing stations; means associated with each station for receiving and retaining the cover sheet material delivered thereto; cutting edges arranged with respect to the work surfaces of the wrapping stations to cut a hanger cover blank, including a body portion substantially complementary to a hanger body and foldable flap portions connected with the body portion, from the cover sheet material on the wrapping stations; means cooperable with the cutting edges to effect cutting of cover blanks from the cover sheet material on the wrapping stations; means for delivering a hanger to successively passing wrapping stations; means on each wrapping station for receiving the hanger delivered thereto and locating it substantially coincidental with the body portion of the hanger cover blank thereon; mechanism on each wrapping station for folding the cover blank flap portions over corresponding hanger sides; means operatively associated with the mechanisms of the successively passing wrapping stations to effect the folding action; and means along the path of successively passing wrapping stations to remove the covered hangers therefrom.

43. In a machine for automatically covering garment hangers, the combination with a wrapping station including means for holding sheet material thereto, and means for centering a hanger and enfolding the same within a cover blank cut from said material, of cutting edges on said station, extending slightly above the work surface thereof, and arranged to cut a hanger cover blank, including a body portion substantially complementary to a hanger body and flap portions adapted for folding over corresponding hanger sides, from the sheet material preparatory to the enfolding action; and means cooperable with the cutting edges and effective to impress the edges against the sheet material to cause the cutting action.

44. In a machine for automatically covering garment hangers, the combination with a rotatable carriage carrying a plurality of wrapping stations, each including vacuum ports for retaining thereon wrapper sheet material, means for holding a hanger on the sheet material and means for enfolding the hanger in the sheet material, of a vacuum distributor plate mounted for synchronous rotation with the carriage and having extending therethrough a circular array of openings, one for each station; means connecting the vacuum ports of the stations to their respective plate openings; a stationary member having on one face a vacuum chamber extending in a circumferential arc congruent with said openings and in abutting relation thereto, said vacuum chamber being so arranged and of such predetermined size that for each station as sheet material is supplied thereto its vacuum ports become effective to retain the sheet material thereon, and after a hanger is enfolded in its cover the vacuum is cut off thereby to free the covered hanger for removal from the station.

45. A machine for automatically covering garment hangers, including a plurality of wrapping stations, each having vacuum ports for holding hanger cover material thereto and further means for holding a hanger on the cover material, vacuum distributor means connected with the vacuum ports of each station, said distributor means including means whereby vacuum to each station selectively is applied thereto during such time cover material is on the station and until the hanger thereon is covered, and further means whereby vacuum selectively is cut off at each station contemporaneously with the completion thereat of the hanger covering operation, said further means thereupon being effective to maintain the covered hanger on its respective station.

References Cited in the file of this patent

UNITED STATES PATENTS

| | | |
|---|---|---|
| 2,152,101 | Scherer | Mar. 28, 1939 |
| 2,608,039 | Abramowski | Aug. 26, 1952 |
| 2,661,583 | Simmons | Dec. 8, 1953 |
| 2,775,080 | Stirn | Dec. 25, 1956 |